United States Patent
Zare Seisan et al.

(10) Patent No.: US 12,555,310 B2
(45) Date of Patent: Feb. 17, 2026

(54) CONTINUOUS RENDERING FOR MOBILE APPARATUSES

(71) Applicant: Snap Inc., Santa Monica, CA (US)

(72) Inventors: Farid Zare Seisan, San Diego, CA (US); Vasily Fomin, Cape Girardeau, MO (US); Edward Lee Kim-Koon, Venice, CA (US)

(73) Assignee: Snap Inc., Santa Monica, CA (US)

( * ) Notice: Subject to any disclaimer, the term of this patent is extended or adjusted under 35 U.S.C. 154(b) by 286 days.

(21) Appl. No.: 18/127,310

(22) Filed: Mar. 28, 2023

(65) Prior Publication Data
US 2024/0331275 A1    Oct. 3, 2024

(51) Int. Cl.
*G06T 15/20* (2011.01)
*G06T 7/70* (2017.01)

(52) U.S. Cl.
CPC ............. *G06T 15/205* (2013.01); *G06T 7/70* (2017.01); *G06T 2200/16* (2013.01); *G06T 2207/30196* (2013.01); *G06T 2207/30244* (2013.01); *G06T 2215/16* (2013.01)

(58) Field of Classification Search
None
See application file for complete search history.

(56) References Cited

U.S. PATENT DOCUMENTS

| | | |
|---|---|---|
| 5,604,843 A | 2/1997 | Shaw et al. |
| 5,689,559 A | 11/1997 | Park |
| 5,880,731 A | 3/1999 | Liles et al. |
| 6,023,270 A | 2/2000 | Brush, II et al. |
| RE36,919 E | 10/2000 | Park |
| RE37,052 E | 2/2001 | Park |

(Continued)

FOREIGN PATENT DOCUMENTS

| | | |
|---|---|---|
| CN | 109863532 A | 6/2019 |
| CN | 110168478 A | 8/2019 |

(Continued)

OTHER PUBLICATIONS

"Bitmoji", Snapchat Support, [Online] Retrieved from the Internet: <URL: https://web.archive.org/web/20190503063620/https://support.snapchat.com/en-US/a/bitmoji>, (captured May 3, 2019), 2 pgs.

(Continued)

*Primary Examiner* — Anh-Tuan V Nguyen
(74) *Attorney, Agent, or Firm* — Schwegman Lundberg & Woessner, P.A.

(57) ABSTRACT

Systems, methods, and computer readable media for continuous rendering are disclosed. Example methods include a head-wearable apparatus that is configured to continuously determine a position or pose of a user and then request graphics to be rendered from a remote rendering module based on the position or pose. If a current time is within a threshold of a presentation time, then the head-wearable apparatus selects rendered graphics received from the remote rendering module that are associated with a position or pose of the user that is closest in time to the presentation time. The selected rendered graphics are then adjusted to account for a difference between the render time and the presentation time. The adjusted rendered graphics are then presented to the user on a display of the head-wearable apparatus.

19 Claims, 14 Drawing Sheets

(56) References Cited

U.S. PATENT DOCUMENTS

| | | |
|---|---|---|
| 6,223,165 B1 | 4/2001 | Lauffer |
| 6,650,793 B1 | 11/2003 | Lund et al. |
| 6,772,195 B1 | 8/2004 | Hatlelid et al. |
| 6,804,417 B1 | 10/2004 | Lund et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| RE43,993 E | 2/2013 | Park |
| 8,384,719 B2 | 2/2013 | Reville et al. |
| RE44,054 E | 3/2013 | Kim |
| RE44,068 E | 3/2013 | Park |
| RE44,106 E | 3/2013 | Park |
| 8,396,708 B2 | 3/2013 | Park et al. |
| RE44,121 E | 4/2013 | Park |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | Andres del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,532,364 B2 | 12/2016 | Fujito |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,158,589 B2 | 12/2018 | Collet et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,348,662 B2 | 7/2019 | Baldwin et al. |
| 10,362,219 B2 | 7/2019 | Wilson et al. |
| 10,432,559 B2 | 10/2019 | Baldwin et al. |
| 10,454,857 B1 | 10/2019 | Blackstock et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,656,797 B1 | 5/2020 | Alvi et al. |
| 10,657,695 B2 | 5/2020 | Chand et al. |
| 10,657,701 B2 | 5/2020 | Osman et al. |
| 10,762,174 B2 | 9/2020 | Denton et al. |
| 10,805,248 B2 | 10/2020 | Luo et al. |
| 10,872,451 B2 | 12/2020 | Sheth et al. |
| 10,880,246 B2 | 12/2020 | Baldwin et al. |
| 10,895,964 B1 | 1/2021 | Grantham et al. |
| 10,896,534 B1 | 1/2021 | Smith et al. |
| 10,933,311 B2 | 3/2021 | Brody et al. |
| 10,938,758 B2 | 3/2021 | Allen et al. |
| 10,964,082 B2 | 3/2021 | Amitay et al. |
| 10,979,752 B1 | 4/2021 | Brody et al. |
| 10,984,575 B2 | 4/2021 | Assouline et al. |
| 10,992,619 B2 | 4/2021 | Antmen et al. |
| 11,010,022 B2 | 5/2021 | Alvi et al. |
| 11,030,789 B2 | 6/2021 | Chand et al. |
| 11,036,781 B1 | 6/2021 | Baril et al. |
| 11,063,891 B2 | 7/2021 | Voss |
| 11,069,103 B1 | 7/2021 | Blackstock et al. |
| 11,080,917 B2 | 8/2021 | Monroy-hernández et al. |
| 11,128,586 B2 | 9/2021 | Al Majid et al. |
| 11,188,190 B2 | 11/2021 | Blackstock et al. |
| 11,189,070 B2 | 11/2021 | Jahangiri et al. |
| 11,199,957 B1 | 12/2021 | Alvi et al. |
| 11,218,433 B2 | 1/2022 | Baldwin et al. |
| 11,229,849 B2 | 1/2022 | Blackstock et al. |
| 11,245,658 B2 | 2/2022 | Grantham et al. |
| 11,249,614 B2 | 2/2022 | Brody |
| 11,263,254 B2 | 3/2022 | Baril et al. |
| 11,270,491 B2 | 3/2022 | Monroy-Hernández et al. |
| 11,284,144 B2 | 3/2022 | Kotsopoulos et al. |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2009/0016617 A1 | 1/2009 | Bregman-Amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |

(56) References Cited

U.S. PATENT DOCUMENTS

| | | |
|---|---|---|
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2015/0029218 A1 | 1/2015 | Williams et al. |
| 2015/0206349 A1 | 7/2015 | Rosenthal et al. |
| 2016/0134840 A1 | 5/2016 | Mcculloch |
| 2016/0234149 A1 | 8/2016 | Tsuda et al. |
| 2017/0039926 A1* | 2/2017 | Greer, III ........... G02B 27/0172 |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0115488 A1* | 4/2017 | Ambrus ............. G02B 27/0172 |
| 2017/0118145 A1 | 4/2017 | Aittoniemi et al. |
| 2017/0199855 A1 | 7/2017 | Fishbeck |
| 2017/0235848 A1 | 8/2017 | Van et al. |
| 2017/0310934 A1 | 10/2017 | Du et al. |
| 2017/0312634 A1 | 11/2017 | Ledoux et al. |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0198743 A1 | 7/2018 | Blackstock et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0097958 A1 | 3/2019 | Collet et al. |
| 2019/0188920 A1 | 6/2019 | Mcphee et al. |
| 2019/0280997 A1 | 9/2019 | Baldwin et al. |
| 2020/0043223 A1* | 2/2020 | Leiby .................... G06F 3/012 |
| 2020/0306637 A1 | 10/2020 | Baldwin et al. |
| 2020/0342673 A1* | 10/2020 | Lohr ....................... G06F 3/013 |
| 2020/0372127 A1 | 11/2020 | Denton et al. |
| 2020/0410575 A1 | 12/2020 | Grantham et al. |
| 2021/0074047 A1 | 3/2021 | Sheth et al. |
| 2021/0089179 A1 | 3/2021 | Grantham et al. |
| 2021/0104087 A1 | 4/2021 | Smith et al. |
| 2021/0168108 A1 | 6/2021 | Antmen et al. |
| 2021/0170270 A1 | 6/2021 | Brody et al. |
| 2021/0185294 A1* | 6/2021 | Malaika ................. G06F 3/013 |
| 2021/0192823 A1 | 6/2021 | Amitay et al. |
| 2021/0209825 A1 | 7/2021 | Assouline et al. |
| 2021/0225058 A1 | 7/2021 | Chand et al. |
| 2021/0240315 A1 | 8/2021 | Alvi et al. |
| 2021/0243482 A1 | 8/2021 | Baril et al. |
| 2021/0243503 A1 | 8/2021 | Kotsopoulos et al. |
| 2021/0266277 A1 | 8/2021 | Allen et al. |
| 2021/0281897 A1 | 9/2021 | Brody et al. |
| 2021/0285774 A1 | 9/2021 | Collins et al. |
| 2021/0306290 A1 | 9/2021 | Voss |
| 2021/0306451 A1 | 9/2021 | Heikkinen et al. |
| 2021/0327127 A1* | 10/2021 | Hinterstoisser ......... G06T 17/00 |
| 2021/0382316 A1* | 12/2021 | Gupta .................... G06F 3/013 |
| 2021/0385180 A1 | 12/2021 | Al Majid et al. |
| 2021/0405831 A1 | 12/2021 | Mourkogiannis et al. |
| 2021/0409535 A1 | 12/2021 | Mourkogiannis et al. |
| 2022/0012929 A1 | 1/2022 | Blackstock et al. |
| 2023/0206575 A1* | 6/2023 | da Silva Pratas Gabriel .............. G06T 19/20 345/419 |
| 2024/0129562 A1* | 4/2024 | Lal ................... H04N 21/21805 |

FOREIGN PATENT DOCUMENTS

| | | |
|---|---|---|
| EP | 2184092 A2 | 5/2010 |
| JP | 2001230801 A | 8/2001 |
| JP | 5497931 B2 | 3/2014 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |
| WO | WO-2019204638 A1 | 10/2019 |
| WO | WO-2024206454 A1 | 10/2024 |

OTHER PUBLICATIONS

"Bitmoji Chrome Extension", [Online] Retrieved from the Internet: <URL: https://web.archive.org/web/20200919024925/https://support.bimoji.com/hc/en-US/articles/360001494066>, (Sep. 19, 2020), 5 pgs.

"Bitmoji Customize text", [Online] Retrieved from the Internet: <URL: https://web.archive.org/web/20210225200456/https://support.bitmoji.com/hc/en-US/articles/360034632291-Customize-Text-on-Bitmoji-Stickers>, (captured Feb. 25, 2021), 3 pgs.

"Bitmoji Family", Snapchat Support, [Online] Retrieved from the Internet: <URL: https://web.archive.org/web/20190503063620/https://support.snapchat.com/en-US/article/bitmoji-family>, (captured May 3, 2019), 4 pgs.

"Instant Comics Starring You & Your Friends", Bitstrips Inc, [Online] Retrieved from the Internet: <URL: https://web.archive.org/web/20150206000940/http://company.bitstrips.com/bitstrips-app.html>, (captured Feb. 6, 2015), 3 pgs.

"Manage Your Bitmoji", Snapchat Support, [Online] Retrieved from the Internet: <URL: https://web.archive.org/web/20190503063620/https://support.snapchat.com/en-US/a/manage-bitmoji>, (captured May 3, 2019), 3 pgs.

"Your Own Personal Emoji", Bitstrips Inc, [Online] Retrieved from the Internet: <URL: https://web.archive.org/web/20150205232004/http://bitmoji.com/>, (captured Feb. 5, 2015), 3 pgs.

Carnahan, Daniel, "Snap is Offering Personalized Video Content Through Bitmoji TV", Business Insider, [Online] Retrieved from the Internet: <URL: https://www.businessinsider.com/snap-offers-personalized-video-content-through-bitmoji-tv-2019-12>, (2019), 10 pgs.

Constine, Josh, "Snapchat launches Bitmoji merch and comic strips starring your avatar", TechCrunch, [Online] Retrieved from the Internet: <URL: https://techcrunch.com/2018/11/13/bitmoji-store/>, (Nov. 13, 2018), 16 pgs.

Constine, Josh, "Snapchat Launches Bitmoji TV: Zany 4-min Cartoons of Your Avatar", TechCrunch, [Online] Retrieved from the Internet: <URL: https://techcrunch.com/2020/01/30/bitmoji-tv/>, (Jan. 3, 20200), 13 pgs.

MacMillan, Douglas, "Snapchat Buys Bitmoji App for More Than $100 Million", The Wallstreet Journal, [Online] Retrieved from the

(56) References Cited

OTHER PUBLICATIONS

Internet: <URL: https://www.wsj.com/articles/snapchat-buys-bitmoji-app-for-more-than-100-million-1458876017>, (Mar. 25, 2016), 5 pgs.
Newton, Casey, "Your Snapchat friendships now have their own profiles—and merchandise", The Verge, [Online] Retrieved from the Internet: <URL: https://www.theverge.com/2018/11/13/18088772/snapchat-friendship-profiles-bitmoji-merchandise-comics>, (Nov. 13, 2018), 5 pgs.
Ong, Thuy, "Snapchat takes Bitmoji deluxe with hundreds of new customization options", The Verge, [Online] Retrieved from the Internet on Nov. 2, 2018: <URL: https://www.theverge.com/2018/1/30/16949402/bitmoji-deluxe-snapchat-customization>, (Jan. 30, 2018), 2 pgs.
Reign, Ashley, "How to Add My Friend's Bitmoji to My Snapchat", Women.com, [Online] Retrieved from the Internet: <URL: https://www.women.com/ashleyreign/lists/how-to-add-my-friends-bitmoji-to-my-snapchat>, (Jun. 30, 2017), 7 pgs.
Tumbokon, Karen, "Snapchat Update: How to Add Bitmoji to Customizable Geofilters", International Business Times, [Online] Retrieved from the Internet : <URL: https://www.ibtimes.com/snapchat-update-how-add-bitmoji-customizable-geofilters-2448152>, (Nov. 18, 2016), 6 pgs.
"International Application Serial No. PCT/US2024/021694, International Search Report mailed Jul. 16, 2024", 4 pgs.
"International Application Serial No. PCT/US2024/021694, Written Opinion mailed Jul. 16, 2024", 9 pgs.

\* cited by examiner

CONTINUOUS RENDERING FOR MOBILE APPARATUSES

TECHNICAL FIELD

Examples of the present disclosure relate generally to continuous rendering for mobile apparatuses. More particularly, but not by way of limitation, examples of the present disclosure relate to a virtual reality (VR), mixed reality (MR), or an augmented reality (AR) head-wearable apparatus continuously sending graphics to be rendered to a backend for preparing a frame to be displayed on a display of the VR, MR, or AR head-wearable apparatus at a presentation time.

BACKGROUND

Users increasingly want VR, MR, and AR wearable devices to operate in a more user-friendly manner with more functions. However, often, the wearable devices have very little room for interface controls on the wearable devices and often the AR head-wearable apparatus have limited power to provide additional functions. Additionally, users increasingly want to run applications that display graphics.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
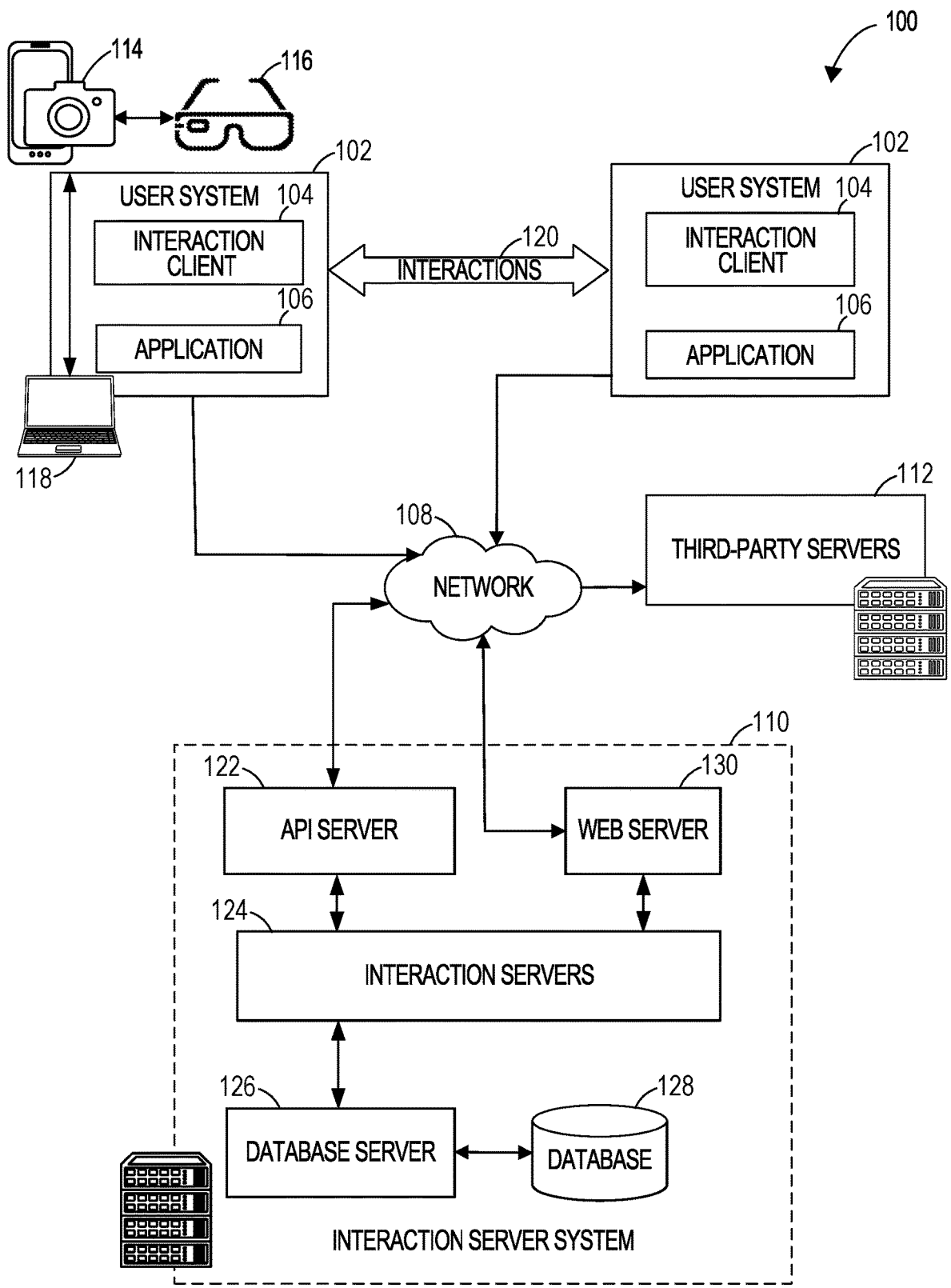
FIG. 1 is a diagrammatic representation of a networked environment in which the present disclosure may be deployed, according to some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

The term AR head-wearable apparatus is used as an illustrative device; however, one skilled in the art will recognize that the methods, systems, and computer readable medium disclosed herein are applicable to other wearable devices or non-wearable devices including VR devices and MR devices.

A head-wearable apparatus 116 presents rendered graphics 945 to a user 992 at a particular rate such as 30 frames 977 per second where the time when a frame 977 is displayed is termed a presentation time 935. The rendered graphics 945 depend on what the user 992 sees of the real-world scene 972. For example, one application 924 is an automobile dealership and the application 924 presents rendered graphics 945 on a display 908 of the head-wearable apparatus 116 that indicates the price and options for automobiles the user 992 is looking at through the head-wearable apparatus 116. The user 992 may be moving or the real-world scene 972 may be changing, so it may be difficult to present the correct rendered graphics 945 to the user 992 for a particular frame 977.

A technical challenge is how to present rendered graphics 945 to a user 992 on a display 908 of a head-wearable apparatus 116 at a presentation time 941 where a render time of the rendered graphics 945 is close to the presentation time 941. If the render time is much different than the presentation time 941, then a user view 998 at the presentation time 941 may be different than the user view 998 at the render time and the rendered graphics 945 may not be correct for the user view 998 at the presentation time 941. An application 924 may call a wrapper module 955 to adjust the rendered graphics 945 to adjust for the difference in the presentation time 935 and the render time, but this may not be enough to correct the rendered graphics 945. For example, the user 992 may be turning their head 995 so that new portions of the real-world scene 972 become visible, and graphical images to render 943 needed for the new portion of the real-world scene 972 may not have been rendered.

The technical challenge is addressed by continuously determining a pose 913, which indicates the user view 998 and location 999 of the user 992 and determining and sending graphical images to render 943 to a remote rendering module 976. The application 924 then continuously receives rendered graphics 945 for the pose 951 back from the rendering module 976. When a current time is within a threshold 979 of the presentation time 935, the application 924 selects rendered graphics 945 with a time 917 of the pose 913 that is closest to the presentation time 935. The application 924 may still adjust the rendered graphics 945 by calling a wrapper module 955. The application 924 then generates a frame 977 using the rendered graphics 945 or the adjusted rendered graphics 953 and causes the frame 977 to be displayed to the user 992 on the display 908 of the head-wearable apparatus 116 at the presentation time 941. The application 924 sends a message to the remote or cloud rendering module 976 to cancel all pending rendering jobs or processes associated with the presentation time 941.

To perform the continuous rendering, the application 924 may need a faster wireless link with the remote rendering module 976 to accommodate the sending and receiving of the graphical images to render 943 and the rendered graphics 945. The application 924 may determine not to use the continuous rendering to conserve battery life or because the time to have graphics rendered remotely is too long to meet the presentation time 935.

In some examples, the technical challenge is addressed by the remote rendering module 976, which receives continuous rendering requests from the head-wearable apparatus 116. When a current time is within a threshold 979 of the presentation time 935, the remote rendering module 976 selects rendered graphics 945 with a time 917 of the pose 913 that is closest to the presentation time 935. The remote or cloud rendering module 976 then sends these rendered graphics 945 to the head-wearable apparatus 116.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple client systems, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems), an interaction server system 110 and third-party servers 112). An interaction client 104 can also communicate with locally hosted applications 106 using Applications Program Interfaces (APIs).

Each user system 102 may include multiple user devices, such as a computing device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, social network information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the client systems (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity graph (e.g., a social graph); the location of friends within a social graph; and opening an application event (e.g., relating to the interaction client 104).

The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally-installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server 112 for example, a markup-language document associated with the small-scale application and processing such a document.

In response to determining that the external resource is a locally-installed application 106, the interaction client 104 instructs the user system 102 to launch the external resource by executing locally-stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
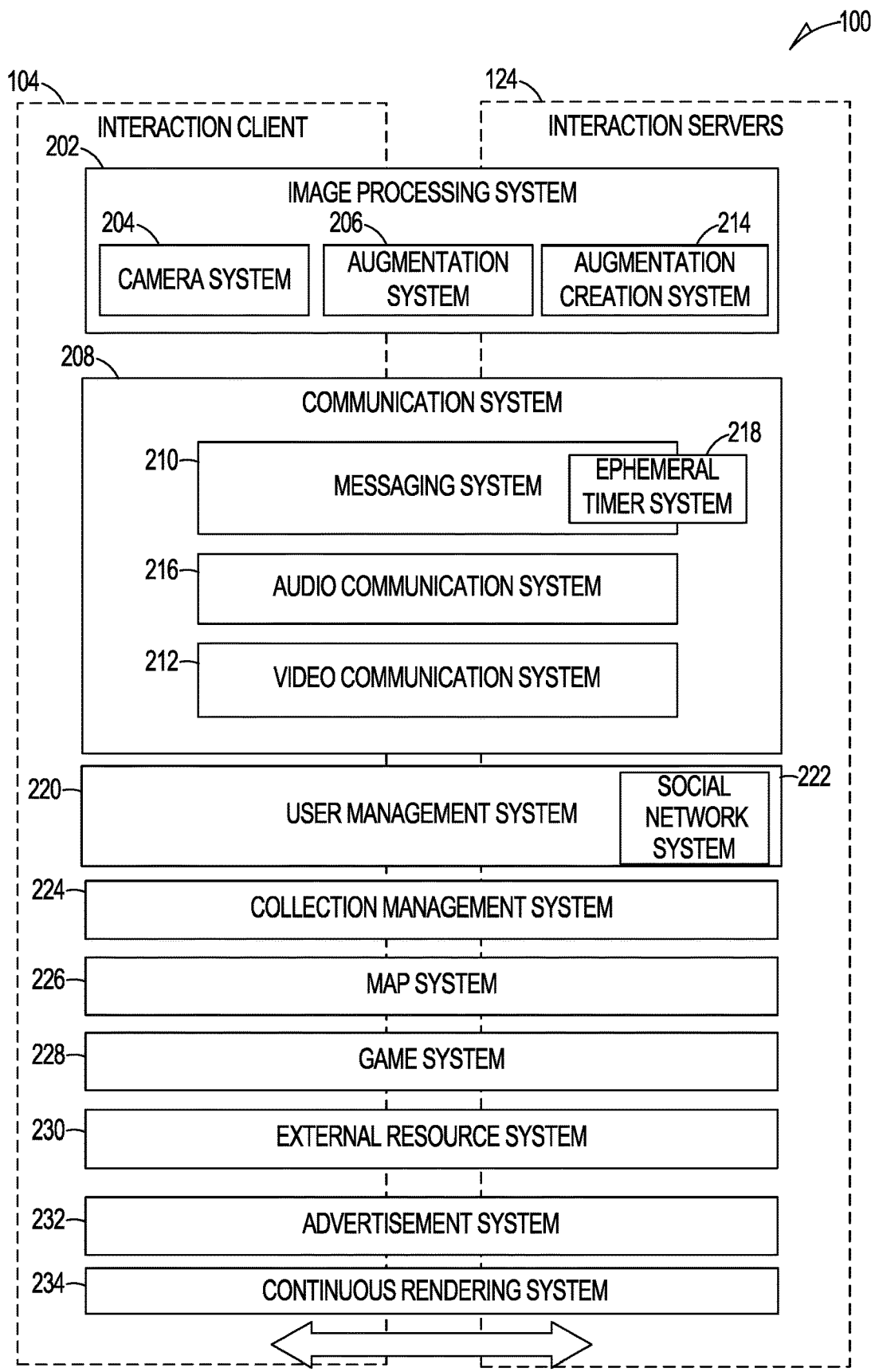
FIG. 2 is a diagrammatic representation of a messaging system, according to some examples, that has both client-side and server-side functionality.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 502 of a user system 102. These augmentations are selected by the augmentation system 206 and presented to a user of an interaction client 104, based on a number of inputs and data, such as for example:

Geolocation of the user system 102; and

Social network information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system 218) that, based on duration and display parameters associated with a message or collection of messages (e.g., a story), selectively enable access (e.g., for presentation and display) to messages and associated content via the interaction client 104. Further details regarding the operation of the ephemeral timer system 218 are provided below. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 220 is operationally responsible for the management of user data and profiles, and includes a social network system 222 that maintains information regarding relationships between users of the interaction system 100.

A collection management system 224 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 224 may also be responsible for publishing an icon that provides notification of a particular collection to the user interface of the interaction client 104. The collection management system 224 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 224 employs machine vision (or image recognition technology) and content rules to curate a content collection automatically. In certain examples, compensation may be paid to a user to include user-generated content into a collection. In such cases, the collection management system 224 operates to automatically make payments to such users to use their content.

A map system 226 provides various geographic location functions and supports the presentation of map-based media content and messages by the interaction client 104. For example, the map system 226 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 228 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 230 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A WebViewJavaScriptBridge running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 232 operationally enables the purchasing of advertisements by third parties for presentation to end-users via the interaction clients 104 and also handles the delivery and presentation of these advertisements.

The continuous rendering system 234 supports system 900 for continuous rendering. The continuous rendering system performs, referring to FIG. 9, the functions associated with the rendering module 976, in accordance with some examples. Additionally, the continuous rendering system 234 may act as an intermediary for sending data between the backend 974 or computing device 114 and the head-wearable apparatus 116. In some examples, the continuous rendering system 234 performs one or more functions described in conjunction with system 900.

Data Architecture

Figure 3:
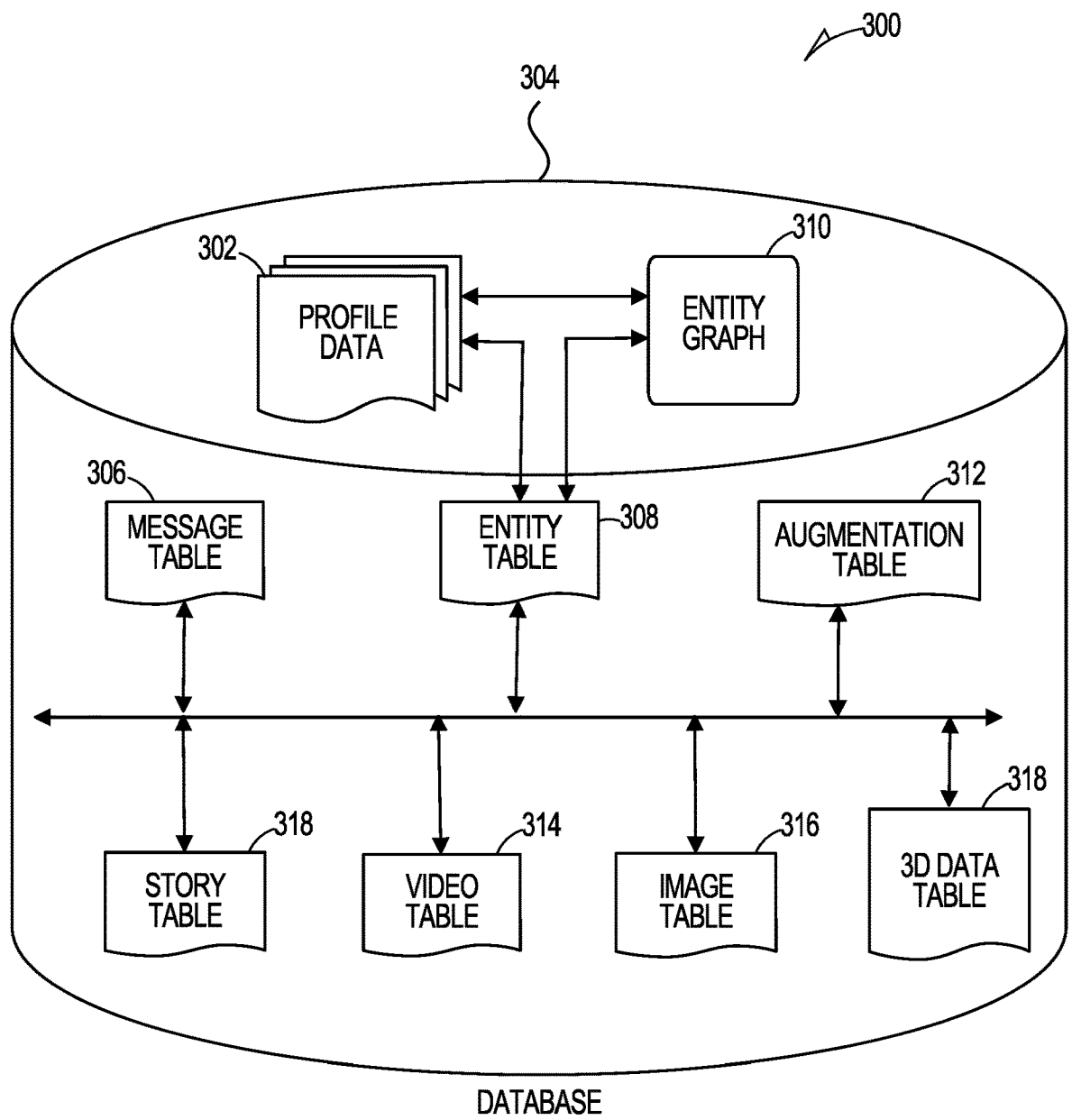
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A story table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

The databases 304 also includes 3D data table 318. The 3D data table 318 includes, referring to FIG. 9, applications 924, graphical images to render 943, rendered graphics 945, and so forth.

Data Communications Architecture

Figure 4:
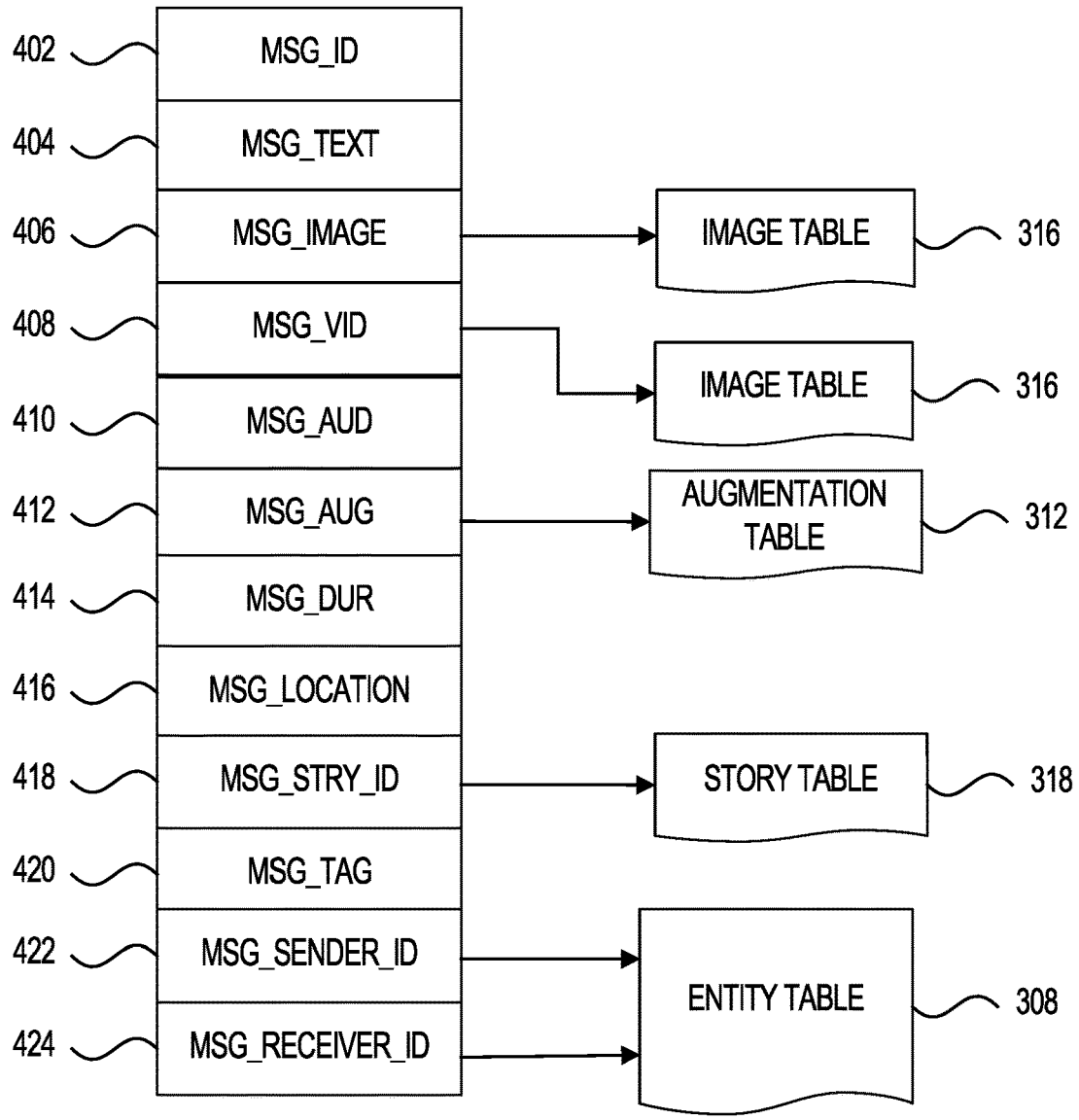
FIG. 4 is a diagrammatic representation of a message, according to some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 304, accessible by the interaction servers 124. Similarly, the content of a message 400 is stored in memory as "in-transit" or "in-flight" data of the user system 102 or the interaction servers 124. A message 400 is shown to include the following example components:

Message identifier 402 is a unique identifier that identifies the message 400.
   Message text payload 404 is text, to be generated by a user via a user interface of the user system 102, and that is included in the message 400.
   Message image payload 406 is image data, captured by a camera component of a user system 102 or retrieved from a memory component of a user system 102, and that is included in the message 400. Image data for a sent or received message 400 may be stored in the image table 316.
   Message video payload 408: video data, captured by a camera component or retrieved from a memory component of the user system 102, and that is included in the message 400. Video data for a sent or received message 400 may be stored in the image table 316.

Message audio payload 410: audio data, captured by a microphone or retrieved from a memory component of the user system 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 312.

Message duration parameter 414 is a parameter value indicating, in seconds, the amount of time for which content of the message (e.g., the message image payload 406, message video payload 408, message audio payload 410) is to be presented or made accessible to a user via the interaction client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

Message story identifier 418: identifier values identifying one or more content collections (e.g., "stories" identified in the story table 318) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the user system 102 on which the message 400 was generated and from which the message 400 was sent.

Message receiver identifier 424: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in a story table 318, and values stored within the message sender identifier 422 and the message receiver identifier 424 may point to user records stored within an entity table 308.

System with Head-Wearable Apparatus

Figure 5:
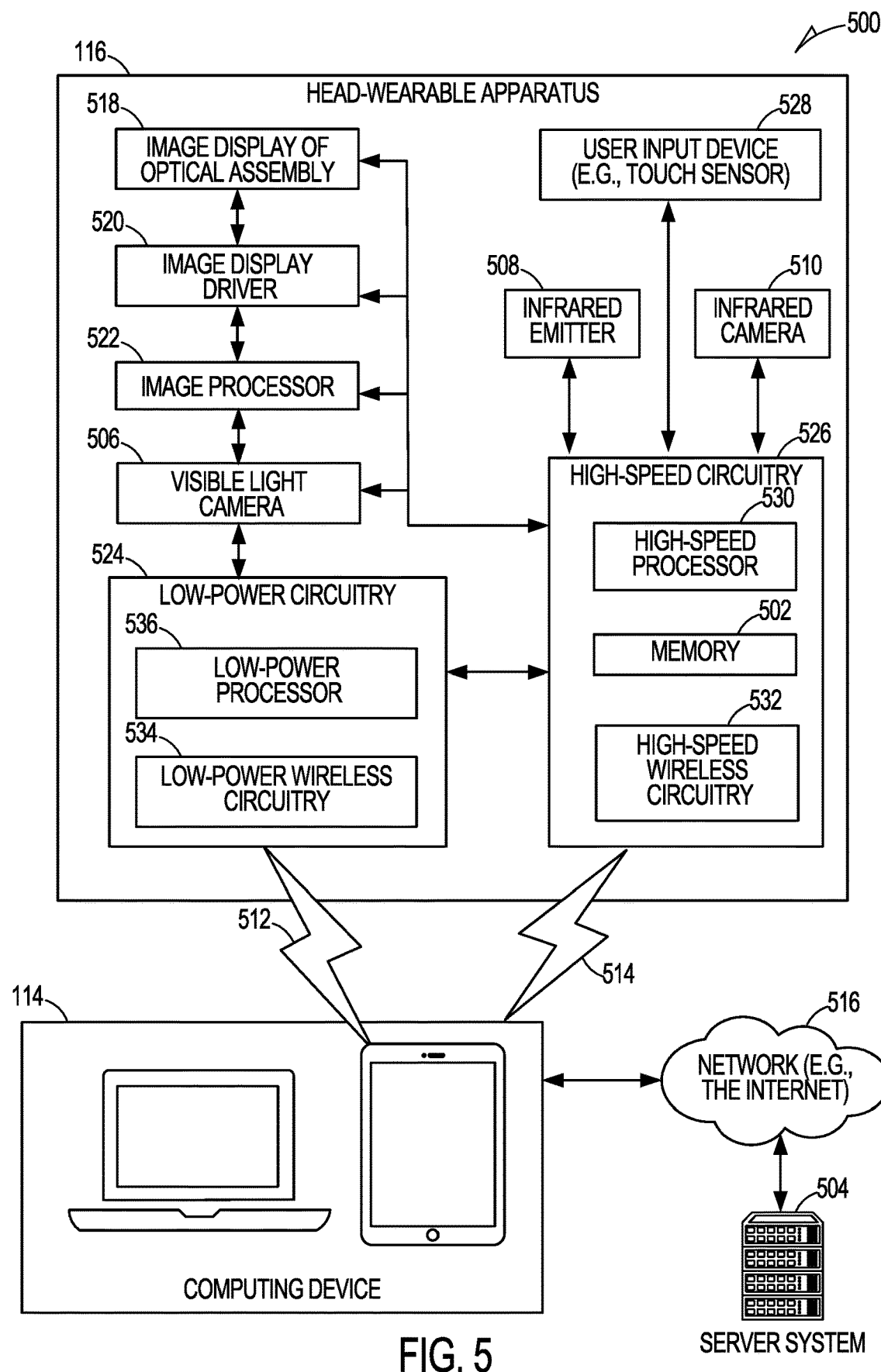
FIG. 5 illustrates a system in which the head-wearable apparatus, according to some examples.

FIG. 5 illustrates a system 500 including a head-wearable apparatus 116 with a selector input device, according to some examples. FIG. 5 is a high-level functional block diagram of an example head-wearable apparatus 116 communicatively coupled to a computing device 114 and various server systems 504 (e.g., the interaction server system 110) via various networks 108.

The head-wearable apparatus 116 includes one or more cameras, each of which may be, for example, a visible light camera 506, an infrared emitter 508, and an infrared camera 510.

The computing device 114 connects with head-wearable apparatus 116 using both a low-power wireless connection 512 and a high-speed wireless connection 514. The computing device 114 is also connected to the server system 504 and the network 516, in accordance with some examples. The computing device 114 may be a portable computing device such as a smart phone, tablet, laptop, or another type of computing device 114 such as a desktop computer, or another type of computing device 114.

The head-wearable apparatus 116 further includes two image displays of the image display of optical assembly 518. The two image displays of optical assembly 518 include one associated with the left lateral side and one associated with the right lateral side of the head-wearable apparatus 116. The head-wearable apparatus 116 also includes an image display driver 520, an image processor 522, low-power circuitry 524, and high-speed circuitry 526. The image display of optical assembly 518 is for presenting images and videos, including an image that can include a graphical user interface to a user of the head-wearable apparatus 116.

The image display driver 520 commands and controls the image display of optical assembly 518. The image display driver 520 may deliver image data directly to the image display of optical assembly 518 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 528 (e.g., touch sensor or push button), including an input surface on the head-wearable apparatus 116. The user input device 528 (e.g., touch sensor or push button) is to receive from the user an input selection to manipulate the graphical user interface of the presented image.

The components shown in FIG. 5 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 506 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 502, which stores instructions to perform a subset or all of the functions described herein. The memory 502 can also include storage device.

As shown in FIG. 5, the high-speed circuitry 526 includes a high-speed processor 530, a memory 502, and high-speed wireless circuitry 532. In some examples, the image display driver 520 is coupled to the high-speed circuitry 526 and operated by the high-speed processor 530 in order to drive the left and right image displays of the image display of optical assembly 518. The high-speed processor 530 may be any processor capable of managing high-speed communications and operation of any general computing system needed for the head-wearable apparatus 116. The high-speed processor 530 includes processing resources needed for managing high-speed data transfers on a high-speed wireless connection 514 to a wireless local area network (WLAN) using the high-speed wireless circuitry 532. In certain examples, the high-speed processor 530 executes an operating system such as a LINUX operating system or other such operating system of the head-wearable apparatus 116, and the operating system is stored in the memory 502 for execution. In addition to any other responsibilities, the high-speed processor 530 executing a software architecture for the head-wearable apparatus 116 is used to manage data transfers with high-speed wireless circuitry 532. In certain examples, the high-speed wireless circuitry 532 is configured to implement Institute of Electrical and Electronic Engineers (IEEE) 802.11 communication standards, also referred to herein as WiFi. In some examples, other high-speed communications standards may be implemented by the high-speed wireless circuitry 532.

The low-power wireless circuitry 534 and the high-speed wireless circuitry 532 of the head-wearable apparatus 116 can include short-range transceivers (Bluetooth™) and wireless wide, local, or wide area network transceivers (e.g., cellular or WiFi). Computing device 114, including the transceivers communicating via the low-power wireless connection 512 and the high-speed wireless connection 514, may be implemented using details of the architecture of the head-wearable apparatus 116, as can other elements of the network 516.

The memory 502 includes any storage device capable of storing various data and applications, including, among other things, camera data generated by the left and right visible light cameras 506, the infrared camera 510, and the image processor 522, as well as images generated for display by the image display driver 520 on the image displays of the image display of optical assembly 518. While the memory 502 is shown as integrated with high-speed circuitry 526, in some examples, the memory 502 may be an independent standalone element of the head-wearable apparatus 116. In certain such examples, electrical routing lines may provide a connection through a chip that includes the high-speed processor 530 from the image processor 522 or the low-power processor 536 to the memory 502. In some examples, the high-speed processor 530 may manage addressing of the memory 502 such that the low-power processor 536 will boot the high-speed processor 530 any time that a read or write operation involving memory 502 is needed.

As shown in FIG. 5, the low-power processor 536 or high-speed processor 530 of the head-wearable apparatus 116 can be coupled to the camera (visible light camera 506, infrared emitter 508, or infrared camera 510), the image display driver 520, the user input device 528 (e.g., touch sensor or push button), and the memory 502.

The head-wearable apparatus 116 is connected to a host computer. For example, the head-wearable apparatus 116 is paired with the computing device 114 via the high-speed wireless connection 514 or connected to the server system 504 via the network 516. The server system 504 may be one or more computing devices as part of a service or network computing system, for example, that includes a processor, a memory, and network communication interface to communicate over the network 516 with the computing device 114 and the head-wearable apparatus 116.

The computing device 114 includes a processor and a network communication interface coupled to the processor. The network communication interface allows for communication over the network 516, low-power wireless connection 512, or high-speed wireless connection 514. Computing device 114 can further store at least portions of the instructions for generating binaural audio content in the computing device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 520. The output components of the head-wearable apparatus 116 further include acoustic components (e.g., speakers), haptic components (e.g., a vibratory motor), other signal generators, and so forth. The input components of the head-wearable apparatus 116, the computing device 114, and server system 504, such as the user input device 528, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 512 and high-speed wireless connection 514 from the computing device 114 via the low-power wireless circuitry 534 or high-speed wireless circuitry 532.

Machine Architecture

Figure 6:
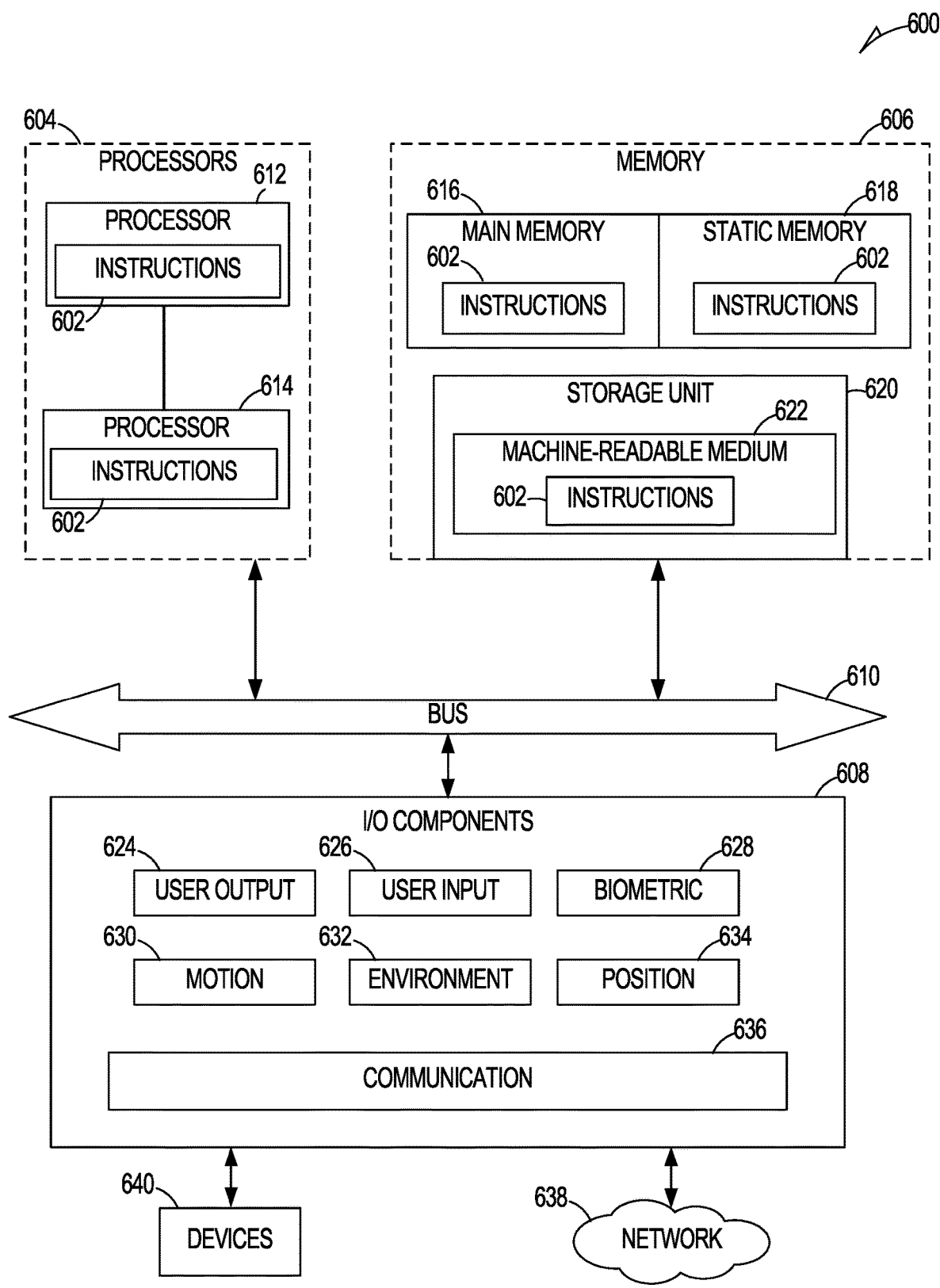
FIG. 6 is a diagrammatic representation of a machine in the form of a computer system within which a set of instructions may be executed to cause the machine to perform any one or more of the methodologies discussed herein, according to some examples.

FIG. 6 is a diagrammatic representation of the machine 600 within which instructions 602 (e.g., software, a program, an application, an applet, an app, or other executable code) for causing the machine 600 to perform any one or more of the methodologies discussed herein may be executed. For example, the instructions 602 may cause the machine 600 to execute any one or more of the methods described herein. The instructions 602 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 602, sequentially or otherwise, that specify actions to be taken by the machine 600. Further, while a single machine 600 is illustrated, the term "machine" shall also be taken to include a collection of machines that individually or jointly execute the instructions 602 to perform any one or more of the methodologies discussed herein. The machine 600, for example, may comprise the user system 102 or any one of multiple server devices forming part of the interaction server system 110. In some examples, the machine 600 may also comprise both client and server systems, with certain operations of a particular method or algorithm being performed on the server-side and with certain operations of the particular method or algorithm being performed on the client-side.

The machine 600 may include processors 604, memory 606, and input/output I/O components 608, which may be configured to communicate with each other via a bus 610. In an example, the processors 604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 612 and a processor 614 that execute the instructions 602. The term "processor" is intended to include multi-core processors that may comprise two or more independent processors (sometimes referred to as "cores") that may execute instructions contemporaneously. Although FIG. 6 shows multiple processors 604, the machine 600 may include a single processor with a single-core, a single processor with multiple cores (e.g., a multi-core processor), multiple processors with a single core, multiple processors with multiples cores, or any combination thereof.

The memory 606 includes a main memory 616, a static memory 618, and a storage unit 620, both accessible to the processors 604 via the bus 610. The main memory 606, the static memory 618, and storage unit 620 store the instructions 602 embodying any one or more of the methodologies or functions described herein. The instructions 602 may also reside, completely or partially, within the main memory 616, within the static memory 618, within machine-readable medium 622 within the storage unit 620, within at least one of the processors 604 (e.g., within the processor's cache memory), or any suitable combination thereof, during execution thereof by the machine 600.

The I/O components 608 may include a wide variety of components to receive input, provide output, produce output, transmit information, exchange information, capture measurements, and so on. The specific I/O components 608 that are included in a particular machine will depend on the type of machine. For example, portable machines such as mobile phones may include a touch input device or other such input mechanisms, while a headless server machine will likely not include such a touch input device. It will be appreciated that the I/O components 608 may include many other components that are not shown in FIG. 6. In various examples, the I/O components 608 may include user output components 624 and user input components 626. The user output components 624 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 626 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 608 may include biometric components 628, motion components 630, environmental components 632, or position components 634, among a wide array of other components. For example, the biometric components 628 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 630 include acceleration sensor components (e.g., accelerometer), gravitation sensor components, rotation sensor components (e.g., gyroscope).

The environmental components 632 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 634 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 608 further include communication components 636 operable to couple the machine 600 to a network 638 or devices 640 via respective coupling or connections. For example, the communication components 636 may include a network interface component or another suitable device to interface with the network 638. In further examples, the communication components 636 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 640 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 636, such as location via Internet Protocol (IP) geolocation, location via Wi-Fi® signal triangulation, location via detecting an NFC beacon signal that may indicate a particular location, and so forth.

The various memories (e.g., main memory 616, static memory 618, and memory of the processors 604) and storage unit 620 may store one or more sets of instructions and data structures (e.g., software) embodying or used by any one or more of the methodologies or functions described herein. These instructions (e.g., the instructions 602), when executed by processors 604, cause various operations to implement the disclosed examples.

The instructions 602 may be transmitted or received over the network 638, using a transmission medium, via a network interface device (e.g., a network interface component included in the communication components 636) and using any one of several well-known transfer protocols (e.g., hypertext transfer protocol (HTTP)). Similarly, the instructions 602 may be transmitted or received using a transmission medium via a coupling (e.g., a peer-to-peer coupling) to the devices 640.

Software Architecture

Figure 7:
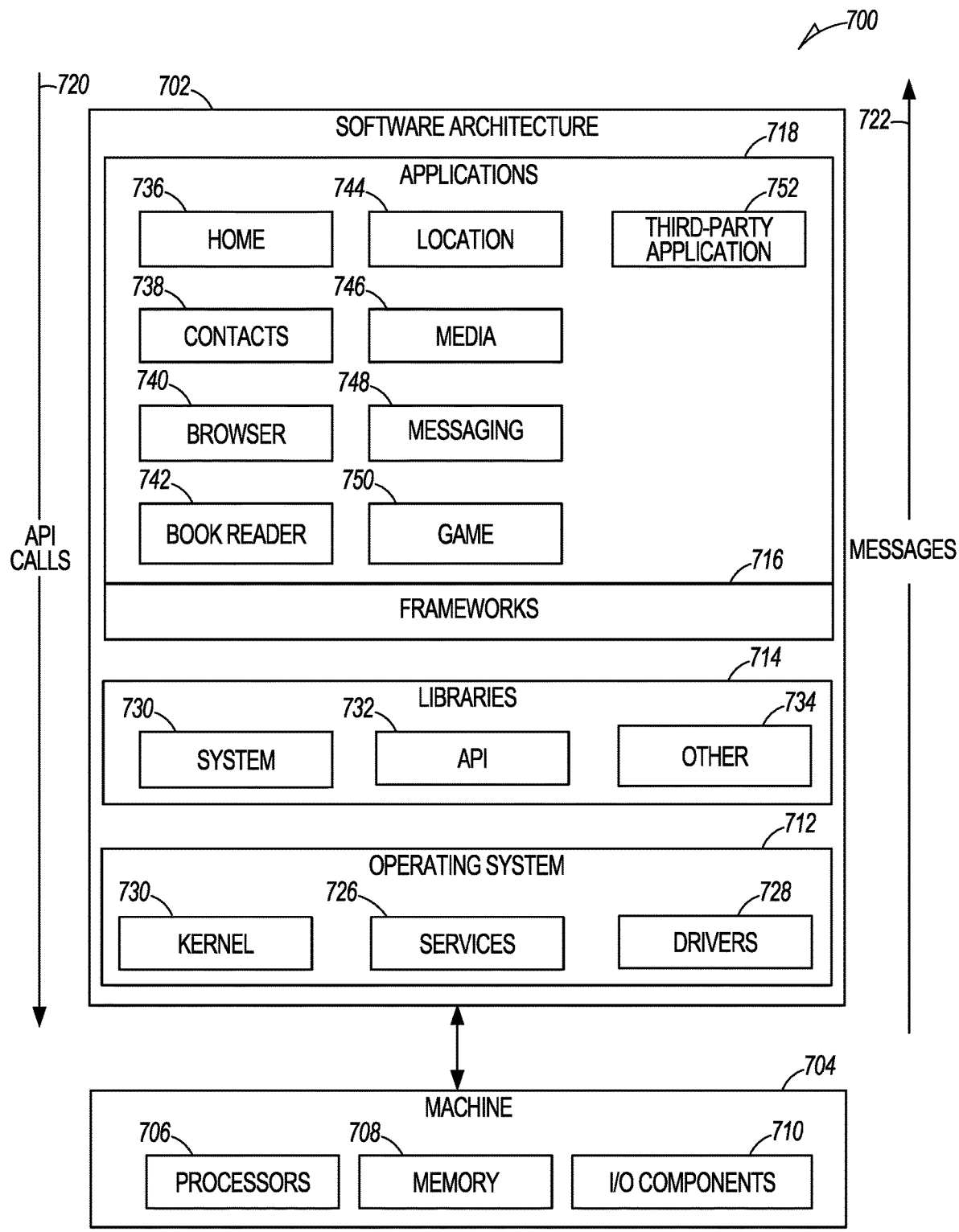
FIG. 7 is a block diagram showing a software architecture within which examples may be implemented.

FIG. 7 is a block diagram 700 illustrating a software architecture 702, which can be installed on any one or more of the devices described herein. The software architecture 702 is supported by hardware such as a machine 704 that includes processors 706, memory 708, and I/O components 710. In this example, the software architecture 702 can be conceptualized as a stack of layers, where each layer provides a particular functionality. The software architecture 702 includes layers such as an operating system 712, libraries 714, frameworks 716, and applications 718. Operationally, the applications 718 invoke API calls 720 through the software stack and receive messages 722 in response to the API calls 720.

The operating system 712 manages hardware resources and provides common services. The operating system 712 includes, for example, a kernel 724, services 726, and drivers 728. The kernel 724 acts as an abstraction layer between the hardware and the other software layers. For example, the kernel 724 provides memory management, processor management (e.g., scheduling), component management, networking, and security settings, among other functionalities. The services 726 can provide other common services for the other software layers. The drivers 728 are responsible for controlling or interfacing with the underlying hardware. For instance, the drivers 728 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 714 provide a common low-level infrastructure used by the applications 718. The libraries 714 can include system libraries 730 (e.g., C standard library) that provide functions such as memory allocation functions, string manipulation functions, mathematic functions, and the like. In addition, the libraries 714 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 714 can also include a wide variety of other libraries 734 to provide many other APIs to the applications 718.

The frameworks 716 provide a common high-level infrastructure that is used by the applications 718. For example, the frameworks 716 provide various graphical user interface (GUI) functions, high-level resource management, and high-level location services. The frameworks 716 can provide a broad spectrum of other APIs that can be used by the applications 718, some of which may be specific to a particular operating system or platform.

In an example, the applications 718 may include a home application 736, a contacts application 738, a browser application 740, a book reader application 742, a location application 744, a media application 746, a messaging application 748, a game application 750, and a broad assortment of other applications such as a third-party application 752. The applications 718 are programs that execute functions defined in the programs. Various programming languages can be employed to create one or more of the applications 718, structured in a variety of manners, such as object-oriented programming languages (e.g., Objective-C, Java, or C++) or procedural programming languages (e.g., C or assembly language). In a specific example, the third-party application 752 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 752 can invoke the API calls 720 provided by the operating system 712 to facilitate functionalities described herein.

Figure 8:
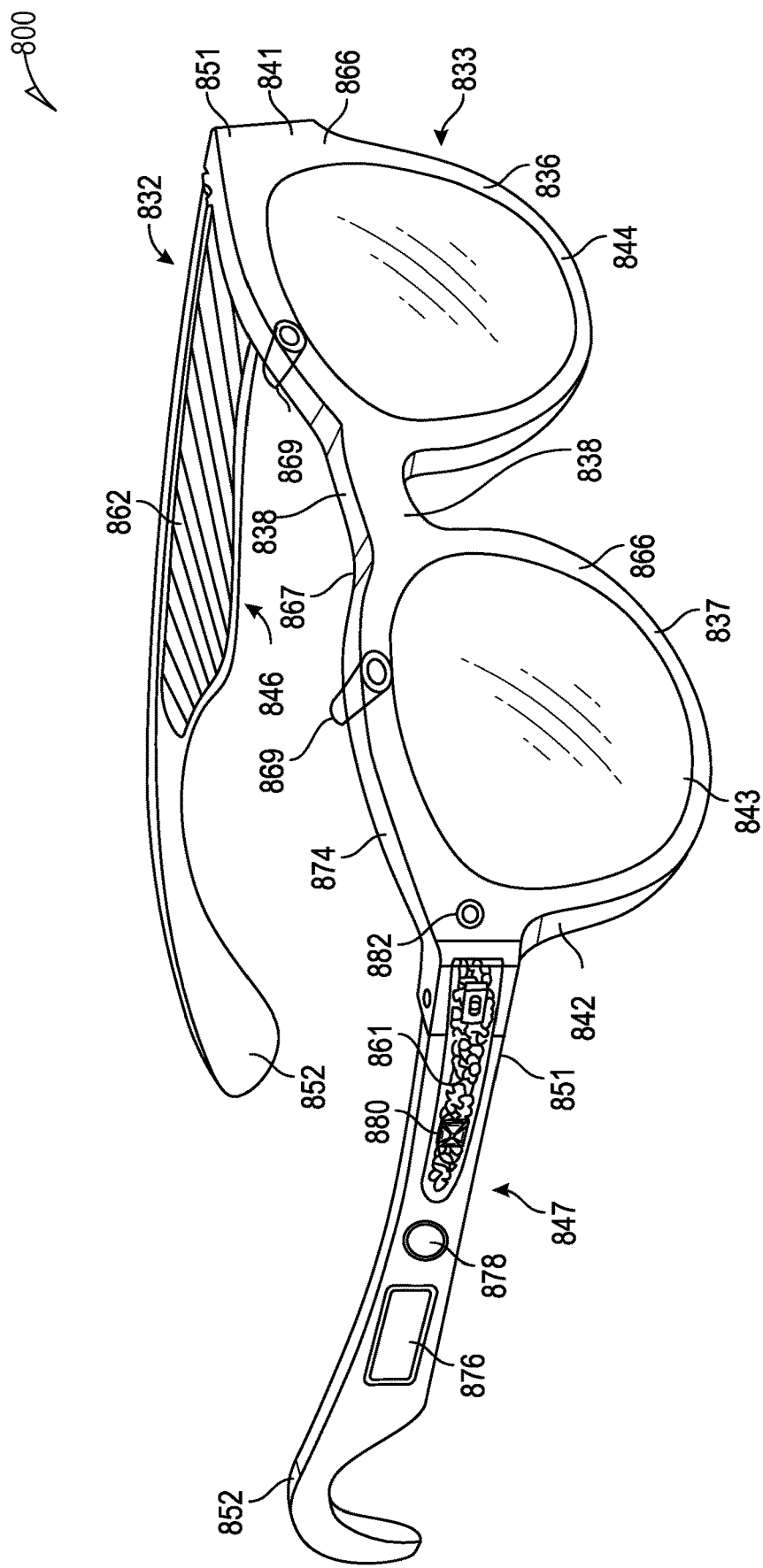
FIG. 8 is a perspective view of a head-wearable apparatus in the form of glasses 800, in accordance with some examples.

FIG. 8 is a perspective view of a head-wearable apparatus in the form of glasses 800, in accordance with some examples. The glasses 800 are an article of eyewear including electronics, which operate within a network system for communicating image and video content. FIG. 8 illustrates an example of the head-wearable apparatus 116. In some examples, the wearable electronic device is termed AR glasses. The glasses 800 can include a frame 832 made from any suitable material such as plastic or metal, including any suitable shape memory alloy. The frame 832 can have a front piece 833 that can include a first or left lens, display, or optical element holder 836 and a second or right lens, display, or optical element holder 837 connected by a bridge 838. The front piece 833 additionally includes a left end portion 841 and a right end portion 842. A first or left optical element 844 and a second or right optical element 843 can be provided within respective left and right optical element holders 836, 837. Each of the optical elements 843, 844 can be a lens, a display, a display assembly, or a combination of the foregoing. In some examples, for example, the glasses 800 are provided with an integrated near-eye display mechanism that enables, for example, display to the user of preview images for visual media captured by cameras 869 of the glasses 800.

The frame 832 additionally includes a left arm or temple piece 846 and a right arm or temple piece 847 coupled to the respective left and right end portions 841, 842 of the front piece 833 by any suitable means such as a hinge (not shown), so as to be coupled to the front piece 833, or rigidly or fixedly secured to the front piece 833 so as to be integral with the front piece 833. Each of the temple pieces 846 and 847 can include a first portion 851 that is coupled to the respective end portion 841 or 842 of the front piece 833 and any suitable second portion 852, such as a curved or arcuate piece, for coupling to the ear of the user. In one example, the front piece 833 can be formed from a single piece of material, so as to have a unitary or integral construction. In one example, the entire frame 832 can be formed from a single piece of material so as to have a unitary or integral construction.

The glasses 800 include a computing device, such as a computer 861, which can be of any suitable type so as to be carried by the frame 832 and, in one example, of a suitable size and shape, so as to be at least partially disposed in one or more of the temple pieces 846 and 847. In one example, the computer 861 has a size and shape similar to the size and shape of one of the temple pieces 846, 847 and is thus disposed almost entirely if not entirely within the structure and confines of such temple pieces 846 and 847.

In one example, the computer 861 can be disposed in both of the temple pieces 846, 847. The computer 861 can include one or more processors with memory, wireless communication circuitry, and a power source. The computer 861 comprises low-power circuitry, high-speed circuitry, location circuitry, and a display processor. Various other examples may include these elements in different configurations or integrated together in different ways. Additional details of aspects of the computer 861 may be implemented as described with reference to the description that follows.

The computer 861 additionally includes a battery 862 or other suitable portable power supply. In one example, the battery 862 is disposed in one of the temple pieces 846 or 847. In the glasses 800 shown in FIG. 8, the battery 862 is shown as being disposed in the left temple piece 846 and electrically coupled using a connection 874 to the remainder of the computer 861 disposed in the right temple piece 847. One or more input and output devices can include a connector or port (not shown) suitable for charging a battery 862 accessible from the outside of the frame 832, a wireless receiver, transmitter, or transceiver (not shown), or a combination of such devices.

The glasses 800 include digital cameras 869. Although two cameras 869 are depicted, other examples contemplate the use of a single or additional (i.e., more than two) cameras 869. For ease of description, various features relating to the cameras 869 will be described further with reference to only a single camera 869, but it will be appreciated that these features can apply, in suitable examples, to both cameras 869.

In various examples, the glasses 800 may include any number of input sensors or peripheral devices in addition to the cameras 869. The front piece 833 is provided with an outward-facing, forward-facing, front, or outer surface 866 that faces forward or away from the user when the glasses 800 are mounted on the face of the user, and an opposite inward-facing, rearward-facing, rear, or inner surface 867 that faces the face of the user when the glasses 800 are mounted on the face of the user. Such sensors can include inward-facing video sensors or digital imaging modules such as cameras 869 that can be mounted on or provided within the inner surface 867 of the front piece 833 or elsewhere on the frame 832 so as to be facing the user, and outward-facing video sensors or digital imaging modules such as the cameras 869 that can be mounted on or provided with the outer surface 866 of the front piece 833 or elsewhere on the frame 832 so as to be facing away from the user. Such sensors, peripheral devices, or peripherals can additionally include biometric sensors, location sensors, accelerometers, or any other such sensors. In some examples, projectors (not illustrated) are used to project images on the inner surface of the optical elements 843, 844 (or lenses) to provide a mixed reality or augmented reality experience for the user of the glasses 800.

The glasses 800 further include an example of a camera control mechanism or user input mechanism comprising a camera control button mounted on the frame 832 for haptic or manual engagement by the user. The camera control button provides a bi-modal or single-action mechanism in that it is disposable by the user between only two conditions, namely an engaged condition and a disengaged condition. In this example, the camera control button is a push button that is by default in the disengaged condition, being depressible by the user to dispose it to the engaged condition. Upon release of the depressed camera control button, it automatically returns to the disengaged condition.

In other examples, the single-action input mechanism can instead be provided by, for example, a touch-sensitive button comprising a capacitive sensor mounted on the frame 832 adjacent to its surface for detecting the presence of a user's finger, to dispose the touch-sensitive button to the engaged condition when the user touches a finger to the corresponding spot on the outer surface 866 of the frame 832. It will be appreciated that the above-described camera control button and capacitive touch button are but two examples of a haptic input mechanism for single-action control of the camera 869, and that other examples may employ different single-action haptic control arrangements.

The computer 861 is configured to perform the methods described herein. In some examples, the computer 861 is coupled to one or more antennas for reception of signals from a GNSS and circuitry for processing the signals where the antennas and circuitry are housed in the glasses 800. In some examples, the computer 861 is coupled to one or more wireless antennas and circuitry for transmitting and receiving wireless signals where the antennas and circuitry are housed in the glasses 800. In some examples, there are multiple sets of antennas and circuitry housed in the glasses 800. In some examples, the antennas and circuitry are configured to operate in accordance with a communication protocol such as Bluetooth™, Low-energy Bluetooth™, IEEE 802, IEEE 802.11az/be, and so forth. In some examples, PDR sensors housed in glasses 800 and coupled to the computer 861. In some examples, the glasses 800 are VR headsets where optical elements 843, 844 are opaque screens for displaying images to a user of the VR headset. In some examples, the computer 861 is coupled to user interface elements such as slide or touchpad 876 and button 878. A long press of button 878 resets the glasses 800. The slide or touchpad 876 and button 878 are used for a user to provide input to the computer 861 and/or other electronic components of the glasses 800. The glasses 800 include one or more microphones 882 that are coupled to the computer 861. The glasses 800 include one or more gyroscopes 880.

Figure 9:
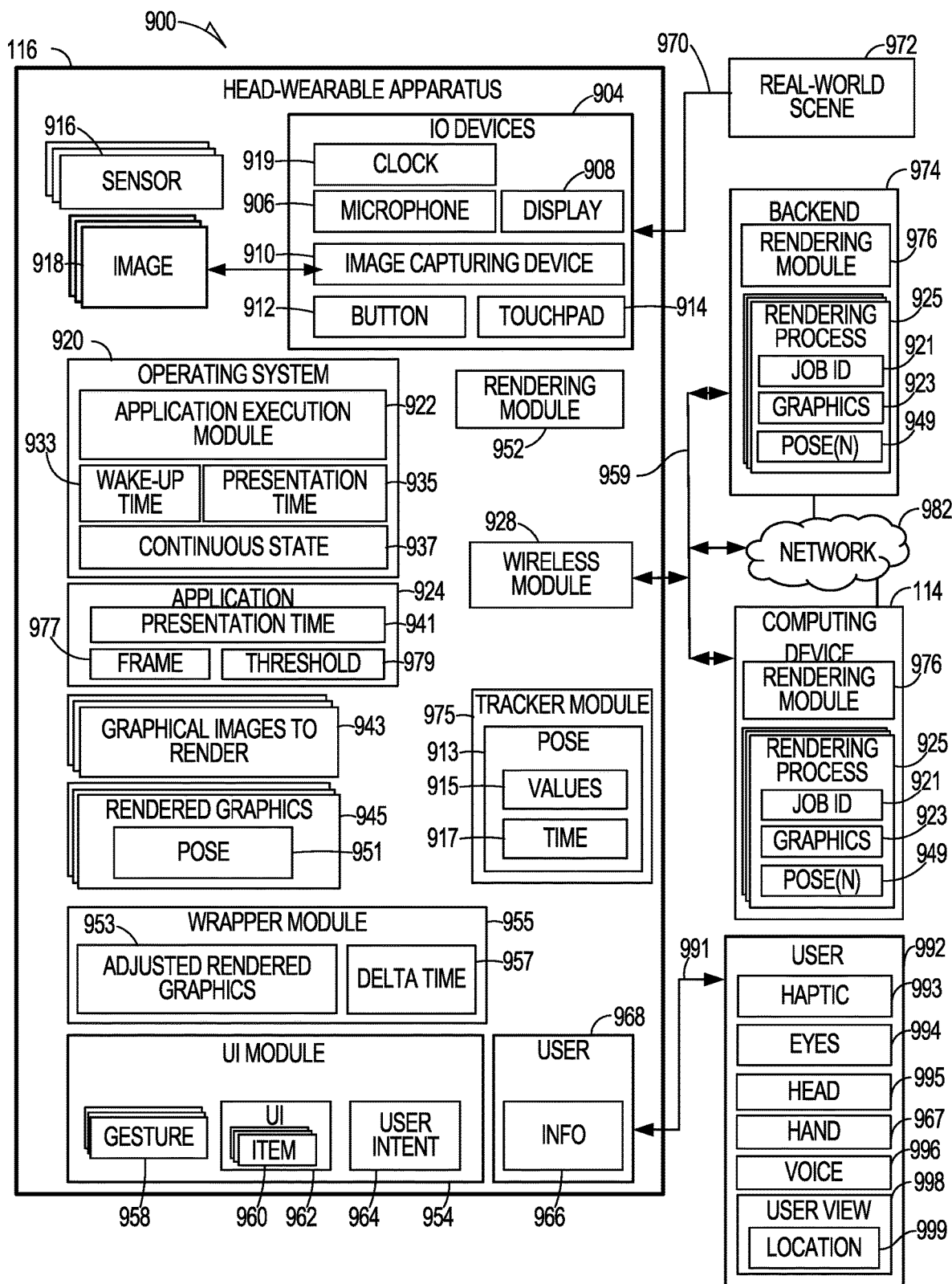
FIG. 9 illustrates a system for continuous rendering for mobile apparatuses, in accordance with some examples.

FIG. 9 illustrates a system 900 for continuous rendering for mobile apparatuses, in accordance with some examples. The system 900 includes a head-wearable apparatus 116 such as is illustrated in FIG. 5 or the glasses 800 of FIG. 8. The head-wearable apparatus 116 may be AR, MR, or VR devices. The system 900 further includes real-world scene 972, which is what the user 992 sees of the world. The image capturing device 910 captures images 918 of the real-world scene 972 using an image capturing device 910 that captures the light 970. The backend 974 is a backend server such as interaction server system 110 of FIG. 1 supporting the continuous rendering system 234 of FIG. 2. The backend 974 includes rendering module 976, 3D data 978, and 3D presentation module 980. Computing device 114 is a computing device 114 such as is disclosed in FIG. 5. The user 992 is a user of the head-wearable apparatus 116.

The input/output (IO) devices 904 include devices that enable the user 992 to receive output or provide input to the head-wearable apparatus 116. The IO devices 904 include a microphone 906, a display 908, a speaker (not illustrated), an image capturing device 910, a button 912, a touchpad 914, a gyroscope (not illustrated), a clock 919, and so forth.

The image capturing device 910 captures the image 918 of the real-world scene 972 which is a front facing view of the user view 998, which is what the user 992 sees through the head-wearable apparatus 116, in accordance with some examples. For example, the user 992 may look through optical elements 843, 844 (or lenses) of FIG. 8 to see the user view 998 of the real-world scene 972.

The location 999 is a geographical location of the user 992, which may be determined by the tracker module 975. The location 999 includes an orientation of the head of the user 992, in accordance with some examples. In some examples, the location 999 is in 3D coordinates within a 3D world coordinate system that indicates a location of the user view 998. In some examples, the location 999 is in 3D coordinates that is relative to an object or another location. In some examples, the location 999 includes one or more of a pitch, roll, and/or yaw of the head 995 of the user 992.

The tracker module 975 determines a pose 913, which includes values 915 and time 917. The values 915 indicate the user view 998 of the real-world scene 972. The values 915 may have three to six degrees of freedom. The values 915 may include the location 999, a GPS location, a location within a 3D-world coordinate system, and so forth. The values 915 can be used to determine the user view 998, in accordance with some examples. The time 917 indicates when the pose 913 was determined. The time 917 may be determined from the clock 919.

The image capturing device 910 is a charged-coupled device (CCD) or another type of device to capture the image 918 of the real-world scene 972. An example of button 912 is button 878 of FIG. 8. An example of the touchpad 914 is touchpad 876. The button 912 and touchpad 914 enable the user 992 to provide haptic 993 input. The microphone 906 enables the user 992 to provide voice 996 input. The image capturing device 910 enables the user 992 to provide gesture 958 input via the UI module 954, which processes or analyzes the images 918 to determine the gesture 958 and the user intent 964 based on the analysis of the images 918.

The sensors 916 includes a gyroscope, light sensor, a global positioning system (GPS), a positioning sensor, a clock, and so forth. An example gyroscope is gyroscopes 880 of FIG. 8. Some devices such as a gyroscope can be both a sensor 916 and an IO device 904. For example, the user 992 may move the head-wearable apparatus 116, which changes the location 999 of the user view 998 and user 992 and communicates input to the head-wearable apparatus 116. The location 999 of the user 992 is assumed to be the same as the head-wearable apparatus 116, in accordance with some examples. The head-wearable apparatus 116 detects the change in location 999 using a sensor 916 such as a gyroscope or another sensor to detect the change of location 999 of the user 992. The movement of the user 992 may have a user intent 964 to communicate input to the head-wearable apparatus 116. However, the user 992 may move with the head-wearable apparatus 116 without a user intent 964 to communicate input to the head-wearable apparatus 116.

The wireless module 928 communicates via communications 959 between the backend 974 and the head-wearable apparatus 116 and communicates via communications 959 between the head-wearable apparatus 116 and the computing device 114. The communications 959 are direct or via one or more devices such as through the network 982. In some examples, the communications 959 are between the head-wearable apparatus 116 and the backend 974 via the computing device 114.

The wireless module 928 is configured to perform wireless communication protocols with the backend 974 and the computing device 114. The communication protocols include LE Bluetooth, Institute for Electrical and Electronic Engineers (IEEE) 802.11 communication protocols, proprietary communications protocols, 3GPP communication protocols, and so forth. The wireless module 928 is in communication with hardware such as transceiver circuitry and antennas, which are part of the IO devices 904, to perform the wireless protocols. The wireless module 928 sets up a wireless communication link between the head-wearable apparatus 116 and the backend 974 and between the head-wearable apparatus 116 and the computing device 114. For example, the wireless module 928 associates with a corresponding wireless module on the backend 974 or the computing device 114. The wireless module 928 may communicate with the backend 974 or computing device 114 via another intermediate devices such as a user system 102, which may also be the backend 974, an access point, a node B, and so forth.

In some examples, the wireless module 928 can be used to determine a location and/or an orientation of the head-wearable apparatus 116 with the assistance of other wireless devices. The computing device 114 may be local or close to the head-wearable apparatus 116 and the head-wearable apparatus 116 may communicate via BLE with the computing device 114. In some examples, the head-wearable apparatus 116 communicates with the computing device 114 via a user system 102 such as a paired mobile phone. In some examples, the computing device 114 is the user system 102. If a head-wearable apparatus 116 is not local to the computing device 114, then the wireless module 928 sets up a communication 959 link between the head-wearable apparatus 116 and the computing device 114. The communications 959 may be via one or more other devices such as user systems 102, the interaction server system 110, and/or the network 982.

The backend 974 includes rendering module 986, rendering process 931, which includes job identification (ID) 927, graphics 929, and pose(N) 947. The Job ID 927 identifies a particularly rendering request or job from the application 924. For example, the job ID 927 may be for a single frame that the application 924 is preparing for display on the display 908 at the presentation time 941.

The rendering module 986 starts multiple rendering processes 931 for the same job ID 927 for different pose(N) 949. For example, the backend 974 receives a first rendering request associated with Job ID 921, graphics 923, and pose(N) 949. The backend 974 runs a rendering process 925 with Job ID 921, graphics 923, and pose(N) 949. The backend 974 may then receive a second rendering request associated with the same Job ID 921, graphics 923, and pose(N+1). The pose(N+1) indicates that a user 992 location 999 has changed, so the pose 913 is different. The backend 974 may have multiple rendering processes 925 running at the same time. When a rendering process 925 is done, then the backend 974 sends the rendered graphics 945 to the head-wearable apparatus 116, in accordance with some examples. The received graphics 929 may be different and depend on the pose(N) 949. Additionally, the graphics 929 may be sent once and used multiple times by the rendering processes 925.

In some examples, the presentation time 941 is sent to the backend 974 and the rendering module 976 continues to generate rendering processes 925 until the current time is within a threshold of the presentation time 941. The rendering module 976 then selects a completed rendering process 925 with a pose (N) 949 having a time 917 of the pose 913 that is latest or closest to the presentation time 941 and sends the rendered graphics 945 to the head-wearable apparatus 116.

The computing device 114 includes rendering module 976, rendering process 925, job ID 921, graphics 923, and pose(N) 949, which are the same or similar as described in conjunction with the backend 974. In some examples, the backend 974 and/or the computing device 114 are configured to perform the method 1100 of FIG. 11.

The user 968 is data that is related to the user 968. The information (info) 966 includes input data 991 from the user 992 and may include additional information about the user 992 such as a social media account to log onto the interaction server system 110, a username, and so forth.

The UI module 954 determines the user intent 964 based on haptic 993, eyes, 994, head 995, hand 967, voice 996, position 997, and so forth, input from the user 992. The user intent 964 is a determination of an item 960 that the user 992 would like to select to have a function performed associated with the item 960. For example, the user 992 may press the button 912 to select an item 960 from a menu of items 960 to perform the function of running the application 924. The UI module 954 tracks the eyes 994, head 995, position 997, and voice 996 of the user 992 to determine if a gesture 958 was performed. For example, the user 992 may close their hand 967 around a 3D AR image of a rendered graphics 945 to indicate a gesture 958 of selecting. The user intent 964 in this example is to select the rendered graphics 945. The UI 962 is user interfaces such as a menu for basic functionality of the head-wearable apparatus 116. The items 960 are the items of the UI 962. The UI 962 may not be displayed to the user as in the case where the user 992 selects an item 960 via a gesture 958.

The operating system 920 manages the resources of the head-wearable apparatus 116. The application execution module 922 is an interpreter that executes applications 924, in accordance with some examples. The application 924 presents adjusted rendered graphics 953 or rendered graphics 945 at a presentation time 941. The operating system 920 wakes up the application 924 at wake-up time 933 to present a frame of the adjusted rendered graphics 953 or the rendered graphics 945 to the user 992 on the display 908 at the presentation time 941. The wake-up time 933 may be based on an estimate how long it will take to render the graphical images to render 943. The continuous state 937 indicates a state of rendering as either continuous or non-continuous. The operating system 920 may determine to use continuous as the continuous state 937 based on one or more factors such as the bandwidth of the wireless connection between the wireless module 928 and the backend 974 or computing device 114, or a cost of using the backend 974 or computing device 114. Another factor may be whether a battery of the head-wearable apparatus 116 is in a conservation mode. Another factor may be how quickly the user 992 is moving. The continuous of the continuous state 937 is used to lessen the delta time 957 so that the wrapper module 955 does not have to adjust the rendered graphics 945. The adjusted rendered graphics 953 may not be as pleasing to the user 992 since it may not be possible to adjust the rendered graphics 945 properly. For example, if the user 992 turned their head 995 very quickly the user view 998 may have moved beyond the rendered graphics 945.

The application 924 or the operating system 920 determines where to have the graphical images to rendered 943 rendered. For example, the application 924 or operating system 920 may determine to use the backend 974, the computing device 114, or the rendering module 952. The head-wearable apparatus 116 has a limit power via batteries and rendering is a computational demanding task, so the application 924 or operating system 920 offloads the rendering to the backend 974 or the computing device 114.

The application 924 calls the render module 952 or the render module 976 to render the graphical images to render 943. The render module 952 or the render module 976 returns the rendered graphics 945, which were rendered based on a pose 951 at time 917. The application 924 then calls the wrapper module 955 to adjust the rendered graphics 945 because the user 992 may have moved from the time 917 of pose 951 to a current time, which is the delta time 957. The wrapper module 955 gets a new pose 913 at the current time from the tracker module 975 and adjusts the rendered graphics 945 based on a difference between the new pose 913 and the pose 951. For example, the head 995 of the user 992 may have moved a fraction of an inch to the left, which means the location 999 and user view 998 have changed, so the rendered graphics 945 are adjusted a fraction of an inch to the left to generate the adjusted rendered graphics 953. The application 924 then takes the adjusted rendered graphics 953 and generates a frame 977 that is then displayed on the display 908 of the head-wearable apparatus 116.

The graphical images to render 943 are a mathematical coordinate-based representation of surfaces of objects in three dimensions, in accordance with some examples. The graphical images to render 943 may include fixed images that need to be adjusted in accordance with a location the fixed image is to appear to be at to the user 992. For example, the fixed image may need to be adjusted for perspective if it is to be seen on angle and reduced or increased in size. The graphical images to render 943 may be based on polygons. Those skilled in the art will recognize that the graphical images to render 943 may be represented in another way. The graphical images to render 943 may be selected from graphics (not illustrated) based on the user view 998. The application 924 may access a captured image 918 and perform operations on the captured image 918 to determine the graphical images to render 943. For example, an application 924 may be to provide additional information for automobiles. The application 924 accesses an image 918 that captures the user view 998 and identifies an automobile. The application 924 then access information regarding the automobile, which may include 3D graphics, and determines the graphical images to render 943 based on the user view 998 and the identified automobile. The application 924 may need to access images 918 that are continuously captured to have up-to-date information regarding the user view 998.

When the continuous state 937 is set to continuous, then the application 924 and/or operating system 920 are configured to operate in accordance with method 1000. The application 924 continuously gets a pose 913 from the tracker module 975 and sends the graphical images to render 943 to the backend 974 or the computing device 114. The application 924 continues with this periodically where the periodicity may be based on several factors. For example, the tracker module 975 may track a mobility of the user 992 and if the user 992 is moving quickly then the periodicity is increased. Another factor is the cost of the bandwidth and/or to have the graphical images to render 943 rendered. Another factor is battery usage. If the battery usage is to conserve the battery, then the periodicity may be reduced. Other factors such as rendering time, transmission time of rendering request, and so forth may be used to determine the periodicity.

The application 924 stops sending the graphics images to render 943 to the backend 974 or the computing device 114 when there is only a threshold 979 amount of time left before the presentation time 941. The threshold 979 is based on how long it would take to send graphical images to render 943 to the backend 974 or computing device 114 and receive the rendered graphics 945.

The application 924 selects the rendered graphics 945 with a time 917 of the pose 951 that is closest to the presentation time 941, which will be the latest time. The application 924 may wait a period of time between the threshold 979 and selecting the rendered graphics 945 as new rendered graphics 945 may be received. The application 924 selects the rendered graphics 945 with enough time left before the presentation time 941 for the wrapper module 955 to adjust the rendered graphics 945, in accordance with some examples. The application 924 then generates a frame from the adjusted rendered graphics 953 and causes it to be displayed on the display 908 of the head-wearable apparatus 116. In some examples, the application 924 may skip calling the wrapper module 955 and generate the frame based on the rendered graphics 945. The application 924 may cause to be sent to the backend 974 or the computing device 114 a message to stop any rendering associated with the presentation time 941. The application 924 may send this after the application 924 selects the rendered graphics 945, in accordance with some examples.

Figure 10:
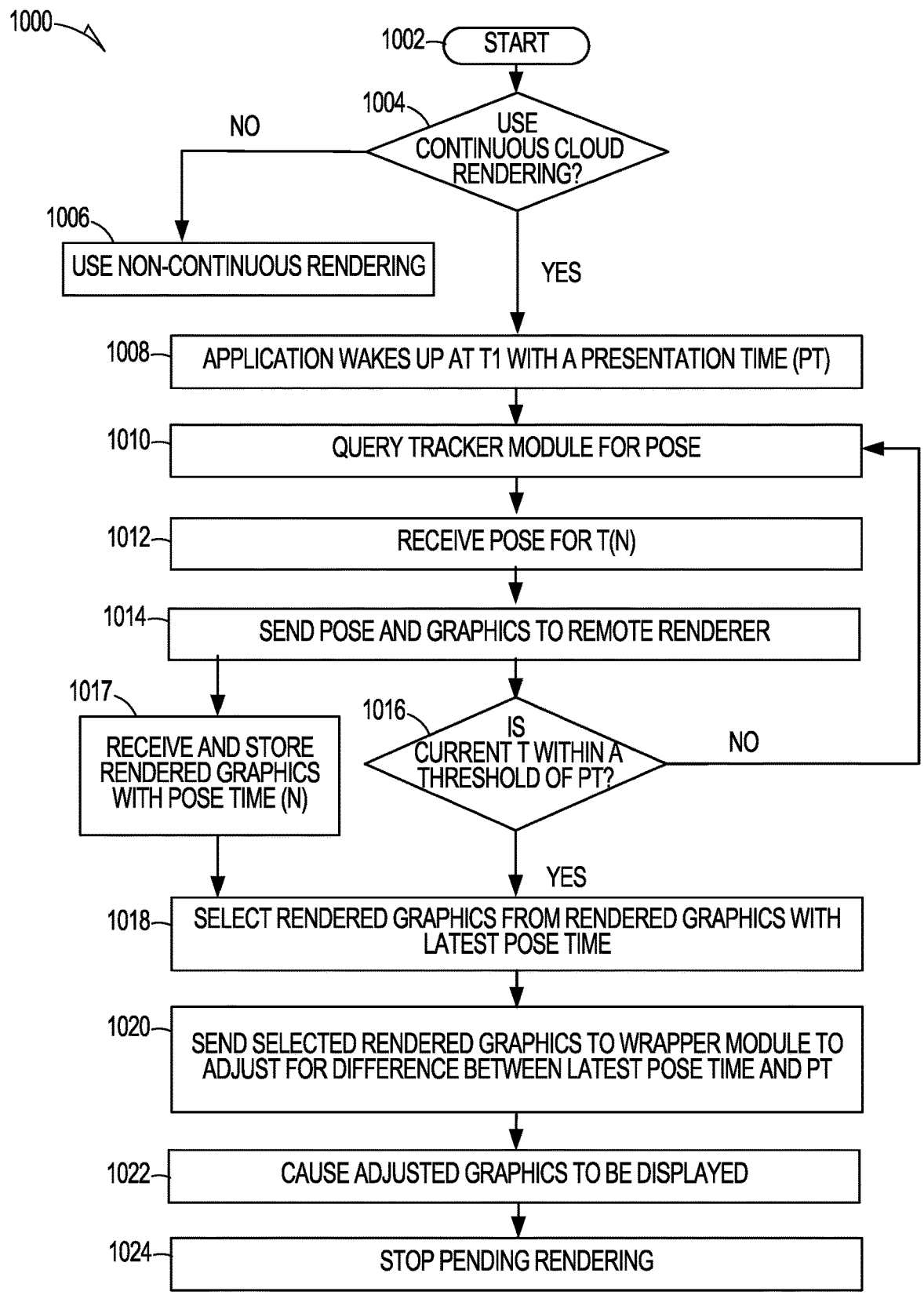
FIG. 10 illustrates a method for continuous rendering for mobile apparatuses, in accordance with some examples.

FIG. 10 illustrates a method 1000 for continuous rendering for mobile apparatuses, in accordance with some examples. The method 1000 begins at 1002 with starting. For example, referring to FIG. 9, the application 924 is execute or run by the operating system 920 and the application 924 intends to display graphics on the display 908 of the head-wearable apparatus 116.

The method 1000 continues at operation 1004 with determining whether to use continuous rendering. For example, the operating system 920 may determine whether to set the continuous state 937 to continuous or non-continuous based on a number of factors as disclosed in conjunction with FIG. 9.

When the determination of operation 1004 is to use non-continuous rendering, then the method 1000 continues at operation 1006 with using non-continuous rendering, which is disclosed in conjunction with FIG. 9. When the determination of operation 1004 is use continuous rendering, then the method 1000 continues at operation 1008 with application wakes up at time T1 with a presentation time (PT). For example, the operating system 920 wakes up application 924 with a presentation time 935 at wake-up time 933. Operation 1004 is optional as the application 924 may be active in memory. Additionally, the operating system 920 may execute or run the application 924 rather than wake up the application 924.

The method 1000 continues at operation 1010 querying the tracker module for a pose. For example, the application 924 queries the tracker module 975 for a pose 913. The tracker module 975 determines the pose 913 as disclosed herein and in conjunction with FIG. 9. The pose 913 provides information that enables the application 924 to determine the user view 998.

The method 1000 continues at operation 1012 with receiving the pose 913 for time (N). The pose 913 for time (N) indicates the location 999 and user view 998 at time (N). Because the user 992 may move the user view 998 and location 999 may change from time (N) to time (N+1).

The method 1000 continues at operation 1014 with sending pose 913 and graphical images to render 943 to the rendering module 976. For example, the application 924 sends a request for the backend 974 or the computing device 114 to render the graphical images to render 943. The application 924 determines a portion of graphical images to render 943 to send to be rendered based on the pose 913. Additionally, the application 924 may not send the graphical images to render 943 if the graphical images to render 943 have already been sent to the backend 974 or the computing device 114. The application 924 may include an indication of how to render the graphical images to render 943, which the rendering module 976 uses. The application 924 may include the presentation time (PT) 935 with one or more of the rendering requests to the rendering module 976.

The method 1000 continues at operation 1016 with is current time (T) within a threshold of the presentation time (PT) 941. For example, the application 924 determines whether there is time to perform operations 1010, 1012, and 1014, and receive a response from the rendering module 976 before the PT 941. If the current time is not within the threshold of the PT 941, then the application 924 returns to operation 1010. In some examples, the application 924 determines if a current time plus a threshold transgresses the presentation time 941. If the current time plus the threshold transgresses the presentation time 941, then the method 1000 continues to operation 1018. If the current time plus the threshold does not transgress the presentation time 941, then the method 1000 continues to operation 1010.

If the current time is within the threshold of the PT 941, then the method 1000 continues at operation 1018 with selecting rendered graphics from rendered graphics 945 with latest time 917 of pose 951. For example, the application 924 selects the rendered graphics 945 which are closest to the PT 941 that have been received from the rendering module 976 and stored on the head-wearable apparatus 116. The operation 1017 may be performed by the application 924 or another module. The operation 1017 receives from the rendering module 976 and stores rendered graphics with a pose time (N). The rendered graphics 945 are in response to operation 1014. The rendering module 976 may return a second request start later than a first request because the rendering of the graphical images to render 943 may be more complicated for the second request or for another reason such as a memory requirement may have slowed down the first rendering.

The method 1000 continues at operation 1020 with sending the selected rendered graphics to a wrapper module to adjust for the difference between a latest pose time and the PT. For example, the application 924 causes the wrapper module 955 to adjust the rendered graphics 945 to compensate for the delta time 957, which is a difference between a current time and the time 917 of the pose 951. The wrapper module 955 queries the tracker module 975 for a current pose 913 and adjusts the rendered graphics 945 to adjust for a difference between the user view 998 or location 999 at the time 917 of the pose 951 and a user view 998 or location 999 at the current time. For example, a person may be moving their head to the left so the rendered graphics 945 need to be adjusted to compensate for the movement of the user view 998. The adjustment may be shifting the rendered graphics 945 a number of pixels. Those skilled in the art would realize that the rendered graphics 945 may be adjusted in other way.

In some examples, the application 924 determines not to adjust the rendered graphics 945 and does not call the wrapper module 955, or the wrapper module 955 may determine that the rendered graphics 945 do not need to be adjusted.

The method 1000 continues at operation 1022 causing the adjusted graphics to be displayed. For example, the application 924 generates a frame 977 with the adjusted rendered graphics 953 or the rendered graphics 945 and causes the frame 977 to be displayed on the display 908 of the head-wearable apparatus 116 at the presentation time 941. In some examples, if rendered graphics are received after or during operation 1020, and the pose time is later than the selected rendered graphics, then the head-wearable apparatus 116 determines whether to display the selected rendered graphics or the just received rendered graphics based on a time difference between the pose time of the just received rendered graphics, the presentation time, and/or the pose time of the selected rendered graphics.

The method 1000 continues at operation 1024 with stopping pending rendering. For example, the application 924 may send a message to the rendering module 976 to stop rendering any rendering requests related to the presentation time 941. In some examples, the application 924 waits until after causing the frame 977 to be displayed since a new rendered graphics 945 with a later time 917 of the pose 951 may arrive. The application 924 may determine to use the just received rendered graphics 945 with the time 917 of the pose 951 rather than the adjusted rendered graphics 953 for generating the frame 977 and displaying. For example, if the just received rendered graphics 945 has a time within a threshold of the presentation time 941, then the application 924 choses the just received rendered graphics 945 over the adjusted rendered graphics 953, in accordance with some examples. In some examples, the application 924 receives an indication from the rendering module 976 that the rendering module 976 has determined that there is not enough time before the presentation time 941 to render any further graphical images to render 943. The application 924 proceeds operation 1018 or a later operation in response to receiving this indication from the rendering module 976.

The method 1000 may optionally include one or more additional operations. The operations of method 1000 may be performed in a different order. One or more of the operations of method 1000 may be optional. The method 1000 may be performed by a mobile device such as the head-wearable apparatus 116 or an apparatus thereof.

Figure 11:
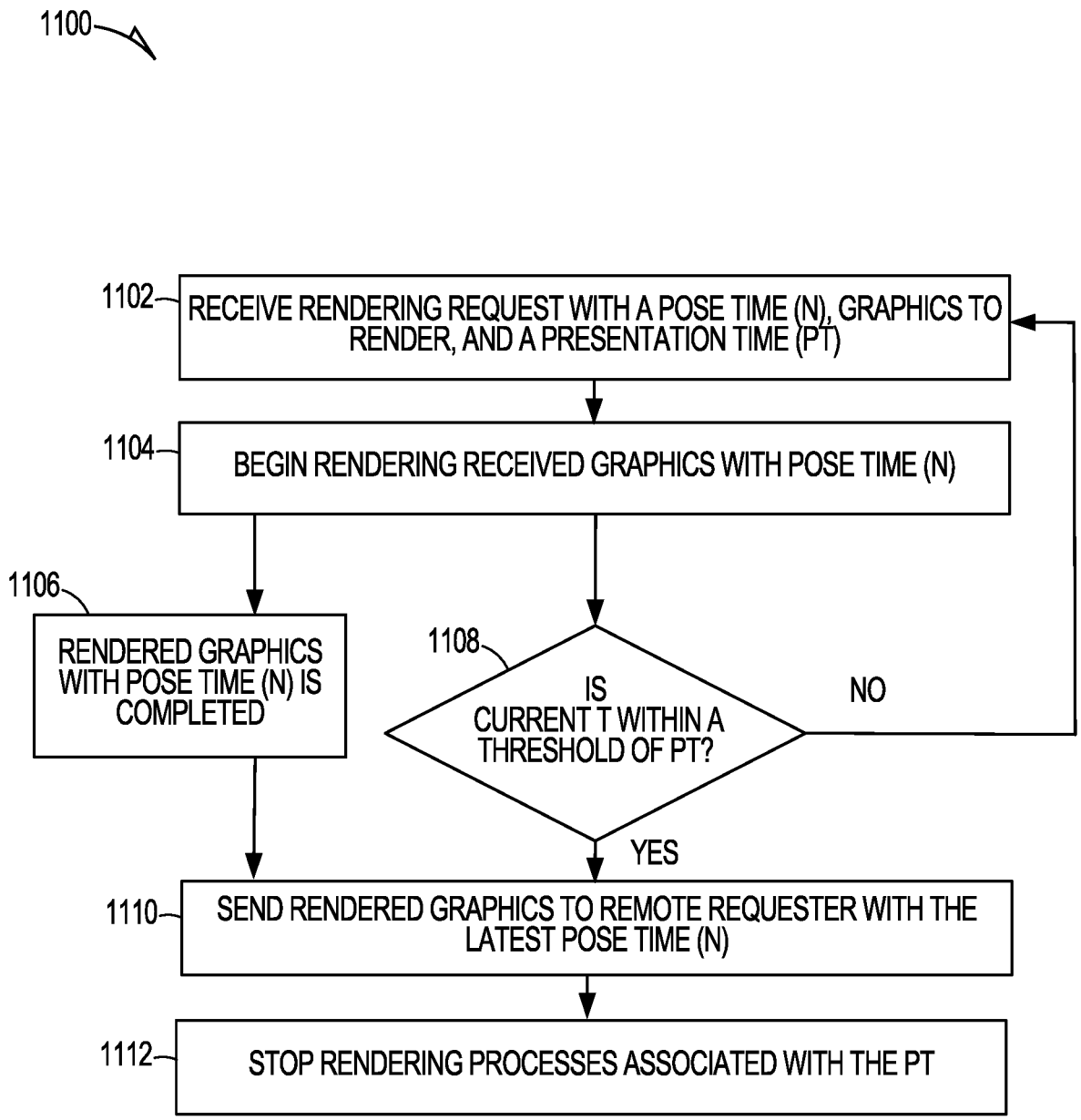
FIG. 11 illustrates a method for continuous rendering for mobile apparatuses, in accordance with some examples.

FIG. 11 illustrates a method 1100 for continuous rendering for mobile apparatuses, in accordance with some examples. The method 1100 begins at operation 1102 with receiving rendering requests with a pose time (N), graphics to render, and presentation time (PT). For example, the rendering module 976 of the backend 974 or the computing device 114 may receive a request to render graphical image to render 943 from the application 924. The application 924 may include a time 917 of a pose 951 and may include a presentation time 941. Additionally, the graphical images to render 943 may be an indication of how to render graphics that are stored on the computing device 114 or the backend 974.

The method 1100 continues at operation 1104 with begin rendering receive graphics with post time (N). For example, the rendering module 976 spawns a process to render the graphics that includes a job identification (ID) 921 such as a process ID, graphics 923, which are the graphical images to render 943, and pose (N) 949, which indicates a time 917 of the pose 951.

The method 1100 continues at operation 1108 with determining whether the current time is within a threshold of a presentation time 941. For example, the rendering module 976 determines if there is enough time to accept new rendering requests at operation 1102 or not. In some examples, the rendering module 976 determines if a current time plus a threshold transgresses the presentation time, and if it does, then the method 1100 continues to operation 1110, and, if it does not, then the method 1100 returns to operation 1102.

If there is time to accept new rendering requests, then the method 1100 returns to operation 1102. In some examples, the rendering module 976 returns to operation 1102 when a rendering request is received from the application 924 and does not determine if there is enough time.

If there is not time to accept new rendering requests, then the method 1100 continues to operation 1110 with sending rendered graphics to remote requester with the latest pose time (N). For example, the rendering module 976 selects rendered graphics 945 with a pose (N) 949 that indicates a time closest to the presentation time 941. In some examples, the rendering module 976 sends the rendered graphics 945 to the application 924 when they have been rendered after operation 1106. Operation 1106 rendered graphics with post time (N) is completed indicates the process that was started in operation 1104 has completed. A first process started earlier than a second process can end after the second process. This is because, for example, the rendering of the graphical images to render 943 may be more complicated for the first process than the second process.

The method 1100 continues at operation 1112 with stop rendering processes associated with the presentation time. For example, any rendering processes started at operation 1104 that have not completed at operation 1106 may be stopped by the rendering module 976. The rendering module 976 may stop the processes based on receiving a message from the application 924, in accordance with some examples.

The method 1100 may optionally include one or more additional operations. The operations of method 1100 may be performed in a different order. One or more of the operations of method 1100 may be optional. The method 1100 may be performed by a backend 974, computing device 114, and/or the head-wearable apparatus 116 or an apparatus thereof.

Figure 12:
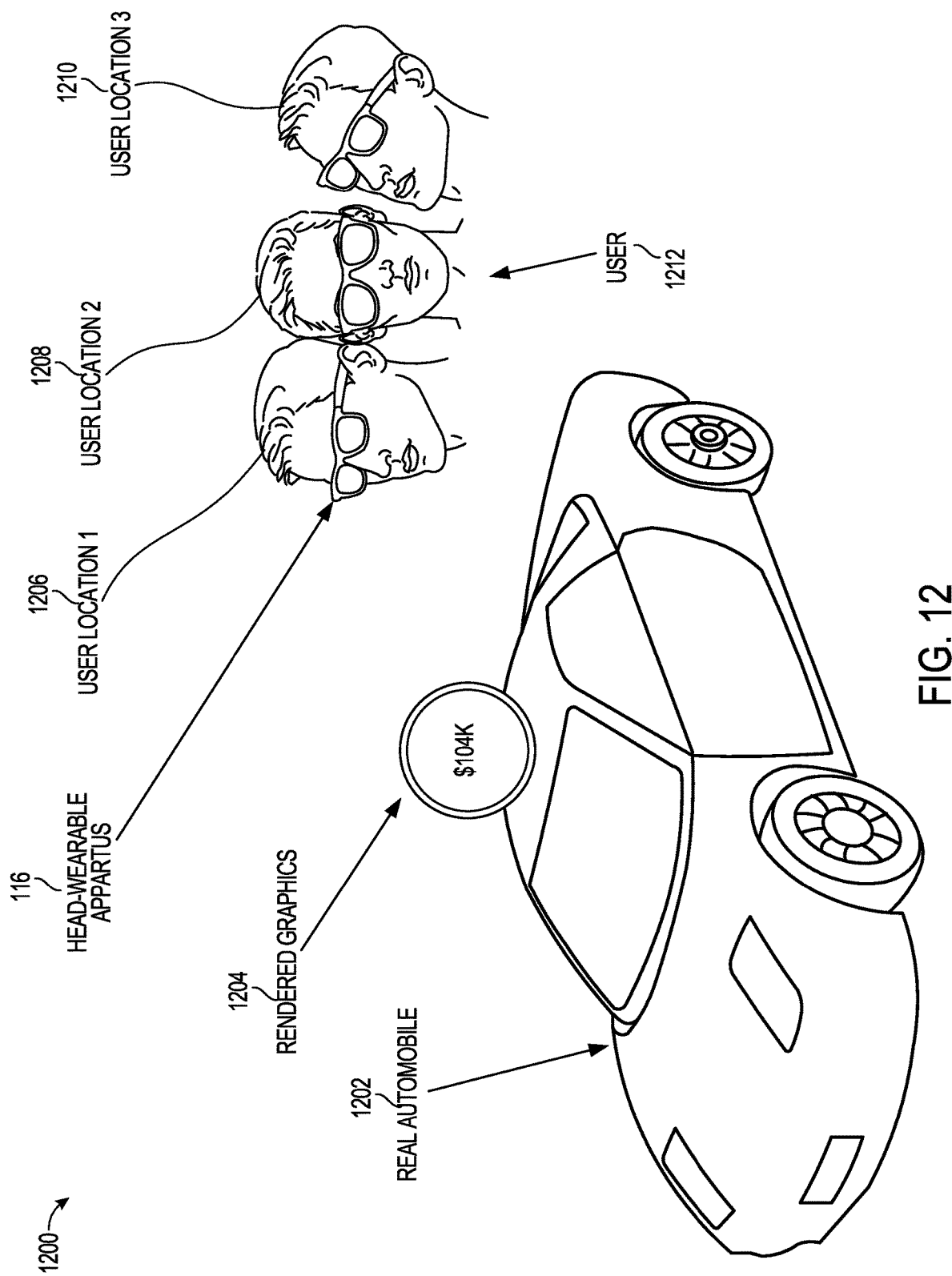
FIG. 12 illustrates an example for continuous rendering for mobile apparatuses, in accordance with some examples.

FIG. 12 illustrates an example 1200 for continuous rendering for mobile apparatuses, in accordance with some examples. Illustrated in FIG. 12 is a real automobile 1202, rendered graphics 1204, head-wearable apparatus 116, user location 1 1206, user location 2 1208, user location 3 1210, and user 1212. The user 1212 is turning their head from user location 1 1206, then user location 2 1208, and then user location 3 1210. The user 1212 is wearing the head-wearable apparatus 116. The application 924 of FIG. 9 is causing the rendered graphics 1204 to be displayed on the display 908 of the head-wearable apparatus 116. The application 924 is for car dealerships. The user 1212 may walk through the car lot and the application 924 provide information regarding the real automobiles 1202. The rendered graphics 1204 is display the price of the real automobile 1202. More information may be provided such as the color options, accessory packages, and so forth.

The user location 1 1206 represents a first pose 913 that the application 924 uses to send the first graphical images to render 943 to the rendering module 976. The user view 998 is what the user 1212 sees through the head-wearable apparatus 116. The user location 2 1208 represents a second pose 913 that the application 924 uses to send the first graphical images to render 943 to the rendering module 976. The continuous state 937 in this case has a value of "continuous". The application 924 is returned both the rendered graphics 945 for user location 1 1206 and the rendered graphics 945 for user location 2 1208. The application 924 when a current time is within the threshold 979 of the presentation time 941 selects the rendered graphics 945 for user location 2 since it has a time 917 of the pose 951 as being closer to the presentation time 941. The application 924 then sends the rendered graphics 945 for user location 2 1208 to the wrapper module 955. The wrapper module 955 requests a pose 913 for user location 3 1210. The wrapper module 955 then adjusts the rendered graphics 945 for user location 2 1208 to match what they should be for user location 3 1210 and generates adjusted rendered graphics 953. In this case, the rendered graphics 1204 may be adjusted to appear to be perpendicular with the user view 998 so the rendered graphics 1204 appear like a poster with the information regarding the real automobile 1202. The application 924 then generates a frame 977 from the adjusted rendered graphics 953 and causes the frame 977 to be displayed on the display 908 of the head-wearable apparatus 116.

Figure 13:
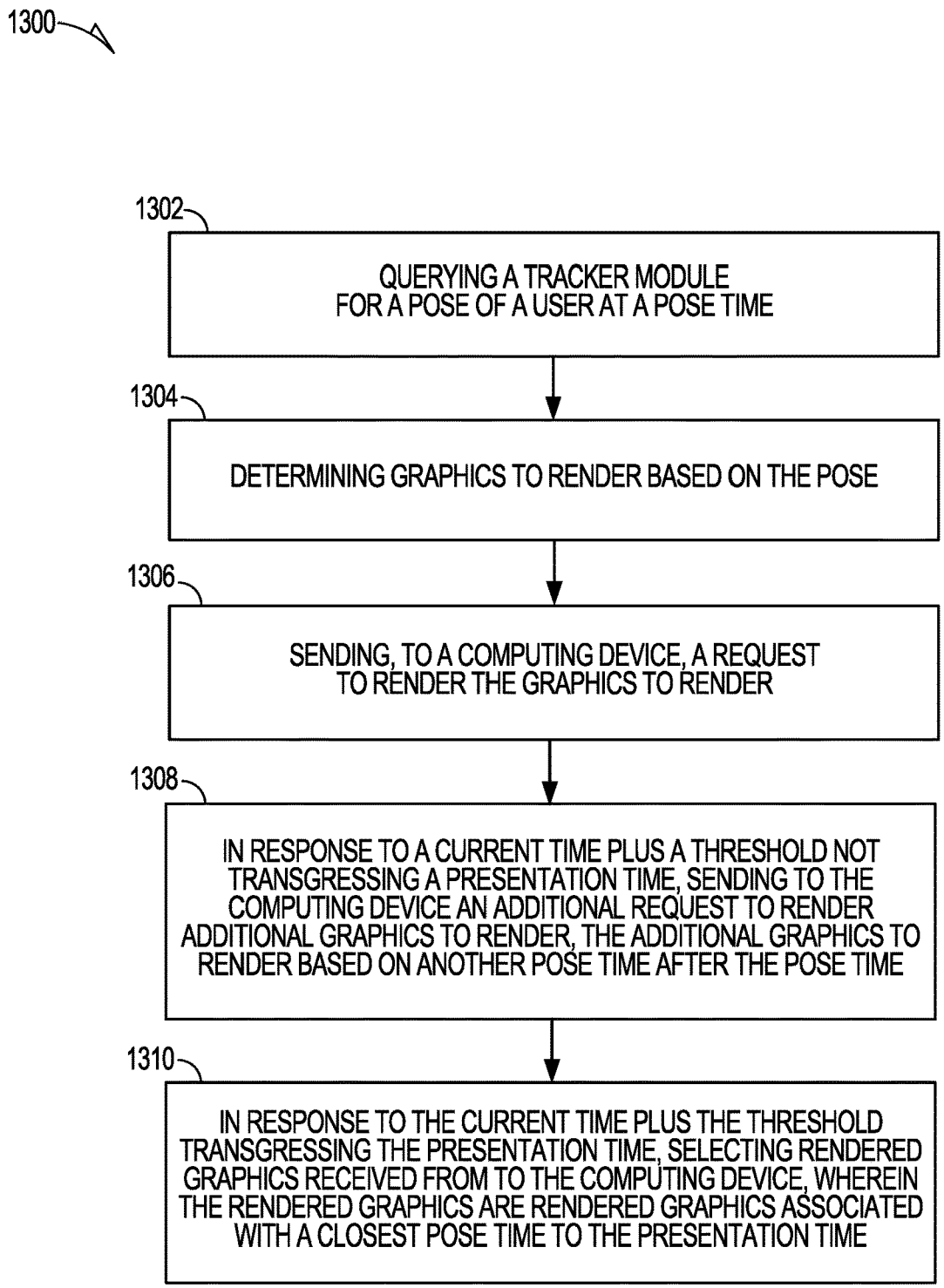
FIG. 13 illustrates a method for continuous rendering for mobile apparatuses, in accordance with some examples.

FIG. 13 illustrates a method 1300 for continuous rendering for mobile apparatuses, in accordance with some examples. The method 1300 begins at operation 1302 with querying a tracker module for a pose of a user at a pose time. For example, the application 924 queries the tracker module 975 for a pose 913.

The method 1300 continues at operation 1304 with determining graphics to render based on the pose. For example, the application 924 determines the graphical images to render 943. The method 1300 continues at operation 1306 with sending, to a computing device, a request to render the graphics to render. For example, the application 924 sends a rendering request to the rendering module 976 via wireless module 928.

The method 1300 continues at operation 1308 with sending to the computing device an additional request to render additional graphics to render, the additional graphics to render based on another pose time after the pose time, in response to a current time plus a threshold not transgressing a presentation time. For example, the application 924 may perform operations 1302, 1304, and 1306 again for a time 917 of the pose 913 that is later than the time 917 of the pose 913 for the first rendering request.

The method 1300 continues at operation 1310 with selecting rendered graphics received from to the computing device, where the rendered graphics are rendered graphics associated with a closest pose time to the presentation time, in response to the current time plus the threshold transgressing the presentation time. For example, the application 924 stores the rendered graphics 945 received from the rendering module 976. If a time from the clock 919 plus a threshold indicates it is time for the application 924 to select rendered graphics 945 to be able to cause the rendered graphics 945 be displayed on the display 908 of the head-wearable apparatus 116, then the application 924 selects rendered graphics 945 with a time 917 of the pose 913 that is closest to the presentation time 941.

The method 1300 may optionally include one or more additional operations. The operations of method 1300 may be performed in a different order. One or more of the operations of method 1300 may be optional. The method 1300 may be performed by a backend 974, computing device 114, and/or the head-wearable apparatus 116 or an apparatus thereof.

Figure 14:
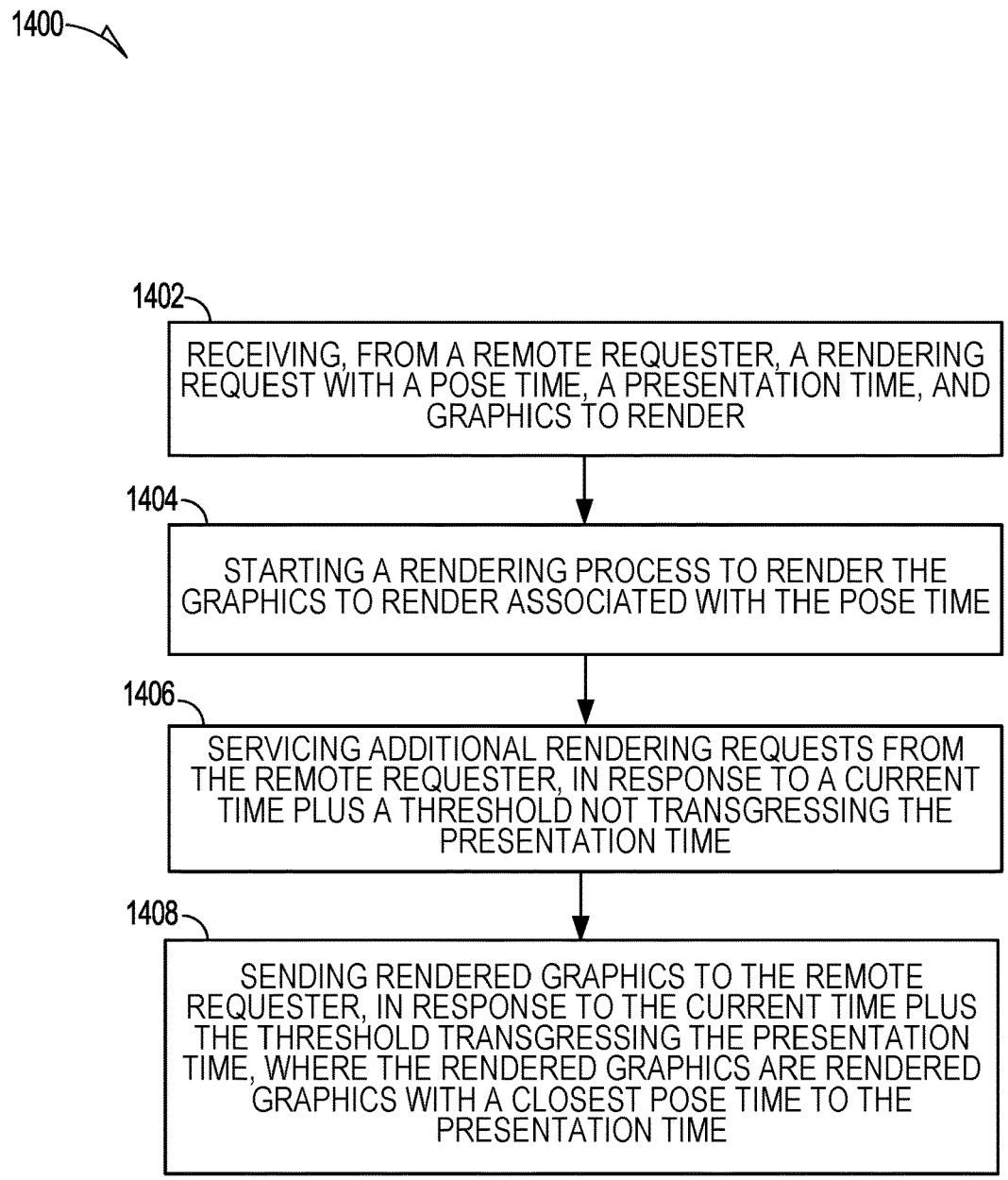
FIG. 14 illustrates a method for continuous rendering for mobile apparatuses, in accordance with some examples.

FIG. 14 illustrates a method 1400 for continuous rendering for mobile apparatuses, in accordance with some examples. The method 1400 begins at operation 1402 with receiving, from a remote requester, a rendering request with a pose time, a presentation time, and graphics to render. For example, the computing device 114 or the backend 974 receive a rendering request from the application 924 via the wireless module 928.

The method 1400 continues at operation 1404 with starting a rendering process to render the graphics to render associated with the pose time. For example, the computing device 114 or the backend 974 start a process to render the graphical images to render included in the rendering request.

The method 1400 continues at operation 1406 with servicing additional rendering requests from the remote requester, in response to a current time plus a threshold not transgressing the presentation time. For example, the application 924 may send additional rendering requests with additional graphical images to render 943 with a pose 913 that includes a time 917 later than the previously received rendering request.

The method 1400 continues at operation 1408 with sending rendered graphics to the remote requester, in response to the current time plus the threshold transgressing the presentation time, where the rendered graphics are rendered graphics with a closest pose time to the presentation time. For example, the computing device 114 or the backend 974 stores rendered graphics locally and selects the rendered graphics 945 with the time 917 of the pose 951 that is latest or closest to the presentation time 935.

The method 1400 may optionally include one or more additional operations. The operations of method 1400 may be performed in a different order. One or more of the operations of method 1400 may be optional. The method 1400 may be performed by a backend 974, computing device 114, and/or an apparatus thereof.

CONCLUSION

Examples enable a mobile device such as a head-wearable apparatus 116 to provide rendered graphics 945 where the graphics are rendered closer to a presentation time 941 when the rendered graphics 945 are displayed on a display 908 of the head-wearable apparatus 116.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or an interaction with other users or computer systems. Additional claimable subject matter further includes the following:

Example 1 is a head-wearable apparatus including: a processor; and a memory storing instructions that, when executed by the processor, configure the head-wearable apparatus to perform operations including: querying a tracker module for a pose of a user at a pose time; determining graphics to render based on the pose; sending, to a computing device, a request to render the graphics; in response to a current time plus a threshold not transgressing a presentation time, sending to the computing device an additional request to render additional graphics, the additional graphics based on another pose time after the pose time; and in response to the current time plus the threshold transgressing the presentation time, selecting rendered graphics received from to the computing device, where the rendered graphics are associated with a closest pose time to the presentation time.

In Example 2, the subject matter of Example 1 includes, where sending further comprises: sending, to the computer device via a wireless connection, the request to render the graphics.

In Example 3, the subject matter of Examples 1-2 includes, where the operations further comprise: receiving, from the computing device, the rendered graphics associated with the closest pose time to the presentation time.

In Example 4, the subject matter of Examples 1-3 includes, where the operations further comprise: adjusting the rendered graphics associated with the closest pose time to the presentation time, where the adjusting is based on a time difference between the closest pose time to the presentation time and a current time.

In Example 5, the subject matter of Example 4 includes, where the operations further comprise: causing the adjusted rendered graphics associated with the closest pose time to the presentation time to be displayed on a display of the head-wearable apparatus.

In Example 6, the subject matter of Examples 4-5 includes, where the operations further comprise: receiving rendered graphics associated with a time closer than the closest pose time to the presentation time after adjusting the rendered graphics associated with the closest pose time to the presentation time; and determining whether to display the rendered graphics associated with a time closer than the closest pose time or the adjusted rendered graphics associated with the closest pose time to the presentation time.

In Example 7, the subject matter of Examples 1-6 includes, where the head-wearable apparatus is a mixed reality (MR), augmented reality (AR), or virtual reality (VR) head-wearable apparatus.

In Example 8, the subject matter of Examples 1-7 includes, where the pose indicates a user view, and where the user view corresponds to a view of a real-world viewed by a user.

In Example 9, the subject matter of Example 8 includes, where the user view corresponds to an image captured from an image capturing device of the head-wearable apparatus at the pose time.

In Example 10, the subject matter of Examples 1-9 includes, where the operations further comprise: determining to use continuous rendering based on a bandwidth of a wireless connection between the head-wearable apparatus and the computing device.

In Example 11, the subject matter of Examples 1-10 includes, where the operations further comprise: determining the graphics based on previously sent graphics to the computing device and the pose.

In Example 12, the subject matter of Examples 1-11 includes, where sending to the computing device an additional request to render additional graphics further comprises: querying the tracker module for an additional pose of the user at an additional pose time; and determining the additional graphics based on the additional pose.

Example 13 is a method for continuous rendering, performed by head-wearable apparatus, the method including: performing, querying a tracker module for a position of a user at a time N, determining graphics based on the position of the user at the time N, and sending to a remote rendering module the graphics for the time N, until the time N plus a threshold value transgresses a performance time; selecting rendered graphics, received from the remote rendering module, where the selected rendered graphics are received from the remote rendering module based on graphics for the time N, and where the time N is a closest time N to a presentation time or a latest time; and causing the rendered graphics to be displayed on a display of the head-wearable apparatus.

In Example 14, the subject matter of Example 13 includes, adjusting the selected rendered graphics based on a difference between the closest time N and a current time; and causing the selected rendered graphics to be displayed on the display of the head-wearable apparatus.

In Example 15, the subject matter of Examples 13-14 includes, where the position indicates a user view and where the user view corresponds to a view of a real-world viewed by a user.

In Example 16, the subject matter of Examples 13-15 includes, where determining the graphics for the time N is further based on graphics previously sent to the remote rendering module.

Example 17 is a non-transitory computer-readable storage medium including instructions that, when processed by a computing device, configure the computing device to perform operations including: receiving, from a remote requester, a rendering request with a pose time, a presentation time, and graphics; starting a rendering process to render the graphics associated with the pose time; in response to a current time plus a threshold not transgressing the presentation time, servicing additional rendering requests from the remote requester; and in response to the current time plus the threshold transgressing the presentation time, sending rendered graphics to the remote requester, where the rendered graphics are rendered graphics with a closest pose time to the presentation time.

In Example 18, the subject matter of Example 17 includes, where the operations further comprise: stopping rendering processes associated with the presentation time.

In Example 19, the subject matter of Examples 17-18 includes, where the operations further comprise: storing the graphics associated with the pose time; and accessing the graphics associated with the pose time for rendering the graphic associated with a later pose time.

In Example 20, the subject matter of Examples 17-19 includes, where the remote request is received from a head-wearable apparatus, and where the head-wearable apparatus is a mixed reality (MR), augmented reality (AR), or virtual reality (VR) head-wearable apparatus, and where the pose time indicates a user view corresponding to a view of a real-world viewed by a user of the head-wearable apparatus.

Example 21 is at least one machine-readable medium including instructions that, when executed by processing circuitry, cause the processing circuitry to perform operations to implement of any of Examples 1-20.

Example 22 is an apparatus including means to implement of any of Examples 1-20.

Example 23 is a system to implement of any of Examples 1-20.

Example 24 is a method to implement of any of Examples 1-20.

What is claimed is:

1. A head-wearable apparatus comprising:
   at least one processor; and
   a memory storing instructions that, when executed by the at least one processor, configure the head-wearable apparatus to perform operations comprising:
   querying a tracker component for a pose of a user at a pose time;
   determining graphics to render based on the pose;
   sending, to a computing device, a request to render the graphics;
   in response to a current time plus a threshold not transgressing a presentation time, sending to the computing device an additional request to render additional graphics, the additional graphics based on another pose time after the pose time; and
   in response to the current time plus the threshold transgressing the presentation time, selecting rendered graphics, with a closest pose time to the presentation time, received from the computing device, and adjusting, based on a time difference between the closest pose time to the presentation time and a current time, the rendered graphics associated with the closest pose time to the presentation time, receiving rendered graphics associated with a time closer than the closest pose time to the presentation time after adjusting the rendered graphics associated with the closest pose time to the presentation time, and determining whether to display the rendered graphics associated with a time closer than the closest pose time or the adjusted rendered graphics associated with the closest pose time to the presentation time.

2. The head-wearable apparatus of claim 1 wherein sending further comprises:
   sending, to the computing device via a wireless connection, the request to render the graphics.

3. The head-wearable apparatus of claim 1 wherein the operations further comprise:
   receiving, from the computing device, the rendered graphics associated with the closest pose time to the presentation time.

4. The head-wearable apparatus of claim 1 wherein the operations further comprise:
   causing the adjusted rendered graphics associated with the closest pose time to the presentation time to be displayed on a display of the head-wearable apparatus.

5. The head-wearable apparatus of claim 1 wherein the head-wearable apparatus is a mixed reality (MR), augmented reality (AR), extended reality (XR), or virtual reality (VR) head-wearable apparatus.

6. The head-wearable apparatus of claim 1 wherein the pose indicates a user view, and wherein the user view corresponds to a view of a real-world viewed by a user.

7. The head-wearable apparatus of claim 6 wherein the user view corresponds to an image captured from an image capturing device of the head-wearable apparatus at the pose time.

8. The head-wearable apparatus of claim 1 wherein the operations further comprise:
   determining to use continuous rendering based on a bandwidth of a wireless connection between the head-wearable apparatus and the computing device.

9. The head-wearable apparatus of claim 1 wherein the operations further comprise:
   determining the graphics based on previously sent graphics to the computing device and the pose.

10. The head-wearable apparatus of claim 1 wherein sending to the computing device an additional request to render additional graphics further comprises:
    querying the tracker component for an additional pose of the user at an additional pose time; and
    determining the additional graphics based on the additional pose.

11. A method for continuous rendering, performed by head-wearable apparatus, the method comprising:
    performing, querying a tracker component for a position of a user at a time N, determining graphics based on the position of the user at the time N, and sending to a remote rendering component the graphics for the time N, until the time N plus a threshold value transgresses a performance time;
    selecting rendered graphics, received from the remote rendering component, wherein the selected rendered graphics are received from the remote rendering component based on graphics for the time N, and wherein the time N is a closest time N to a presentation time or a latest time;
    adjusting the selected rendered graphics based on a difference between the closest time N and a current time;
    receiving rendered graphics associated with a time N closer than the closest time N to the presentation time after adjusting the rendered graphics, and determining whether to display the rendered graphics associated with the time N closer than the closest time N or the adjusted rendered graphics;
    in response to a determination to display the rendered graphics, causing the rendered graphics to be displayed on a display of the head-wearable apparatus; and
    in response to a determination to display the rendered graphics with the time N closer than the closest time N, causing the rendered graphics to be displayed on a display of the head-wearable apparatus.

12. The method of claim 11 wherein the position indicates a user view and wherein the user view corresponds to a view of a real-world viewed by a user.

13. The method of claim 11 wherein determining the graphics for the time N is further based on graphics previously sent to the remote rendering component.

14. The method of claim 11, wherein the head-wearable apparatus is a mixed reality (MR), augmented reality (AR), extended reality (XR), or virtual reality (VR) head-wearable apparatus.

15. A non-transitory computer-readable storage medium including instructions that, when processed by at least one processor of a head-wearable apparatus, configure the at least one processor to perform operations comprising:
    querying a tracker component for a pose of a user at a pose time;
    determining graphics to render based on the pose;
    sending, to a computing device, a request to render the graphics;
    in response to a current time plus a threshold not transgressing a presentation time, sending to the computing device an additional request to render additional graphics, the additional graphics based on another pose time after the pose time; and in response to the current time plus the threshold transgressing the presentation time, selecting rendered graphics, with a closest pose time to the presentation time, received from the computing device, and adjusting, based on a time difference between the closest pose time to the presentation time and a current time, the rendered graphics associated with the closest pose time to the presentation time, receiving rendered graphics associated with a time closer than the closest pose time to the presentation time after adjusting the rendered graphics associated with the closest pose time to the presentation time, and determining whether to display the rendered graphics associated with a time closer than the closest pose time or the adjusted rendered graphics associated with the closest pose time to the presentation time.

16. The non-transitory computer-readable storage medium of claim 15 wherein the head-wearable apparatus is a mixed reality (MR), augmented reality (AR), extended reality (XR), or virtual reality (VR) head-wearable apparatus, and wherein the pose time indicates a user view corresponding to a view of a real-world viewed by a user of the head-wearable apparatus.

17. The non-transitory computer-readable storage medium of claim 15, wherein sending further comprises:
sending, to the computing device via a wireless connection, the request to render the graphics.

18. The non-transitory computer-readable storage medium of claim 15, wherein the operations further comprise:
receiving, from the computing device, the rendered graphics associated with the closest pose time to the presentation time.

19. The non-transitory computer-readable storage medium of claim 15, wherein the operations further comprise:
causing the adjusted rendered graphics associated with the closest pose time to the presentation time to be displayed on a display of the head-wearable apparatus.

* * * * *